US012647218B2

(12) United States Patent
Yang et al.

(10) Patent No.: US 12,647,218 B2
(45) Date of Patent: Jun. 2, 2026

(54) METHOD AND DEVICE FOR TRANSMITTING AND RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 18/658,258

(22) Filed: May 8, 2024

(65) Prior Publication Data

US 2024/0297744 A1 Sep. 5, 2024

Related U.S. Application Data

(63) Continuation of application No. 17/789,385, filed as application No. PCT/KR2021/014329 on Oct. 15, 2021, now Pat. No. 12,003,335.
(Continued)

(30) Foreign Application Priority Data

| Jan. 15, 2021 | (KR) | ........................ 10-2021-0006276 |
| Apr. 5, 2021 | (KR) | ........................ 10-2021-0044258 |

(Continued)

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 1/1896* (2013.01);
(Continued)

(58) Field of Classification Search
CPC ... H04L 1/1854; H04L 1/1812; H04L 1/1896; H04L 5/0044; H04L 5/0055; H04L 5/0078; H04W 72/0446
See application file for complete search history.

(56) References Cited

U.S. PATENT DOCUMENTS

| 11,044,746 B2 | 6/2021 | Chien et al. |
| 11,356,979 B2 | 6/2022 | He et al. |

(Continued)

FOREIGN PATENT DOCUMENTS

| CN | 103109484 | 5/2013 |
| CN | 110546911 | 12/2019 |

(Continued)

OTHER PUBLICATIONS

3GPP TS 38.214 version 16.3.0(Nov. 2020), study on Physical layer procedures for data(Release 16), Nov. 2020, 169 pages.
(Continued)

*Primary Examiner* — Shelly A Chase
(74) *Attorney, Agent, or Firm* — Fish & Richardson P.C.

(57) ABSTRACT

A terminal according to one embodiment of the present invention determines and reports a specific codebook-based HARQ-ACK on the basis of the result of receiving a plurality of PDSCHs, and, on the basis of a first-type codebook-based HARQ-ACK having been set for scheduling of the plurality of PDSCHs, the terminal can perform first start symbol and length indicator value (SLIV) pruning on the basis of a set of the SLIVs of PDSCHs, which can be potentially scheduled on each slot of a bundling window determined on the basis of a plurality of candidate PDSCH-to-HARQ feedback timing values, and perform second SLIV pruning on the basis of a set of the SLIVs of PDSCHs, which can be potentially scheduled even on at least one slot that does not belong to the bundling window.

20 Claims, 14 Drawing Sheets

Related U.S. Application Data

(60) Provisional application No. 63/233,317, filed on Aug. 15, 2021, provisional application No. 63/174,017, filed on Apr. 12, 2021, provisional application No. 63/092,487, filed on Oct. 15, 2020.

(30) Foreign Application Priority Data

| | | |
|---|---|---|
| May 7, 2021 | (KR) | 10-2021-0059531 |
| Aug. 5, 2021 | (KR) | 10-2021-0103311 |

(51) Int. Cl.

| | |
|---|---|
| *H04L 1/1867* | (2023.01) |
| *H04L 5/00* | (2006.01) |
| *H04W 72/0446* | (2023.01) |

(52) U.S. Cl.
CPC .......... *H04L 5/0044* (2013.01); *H04L 5/0055* (2013.01); *H04L 5/0078* (2013.01); *H04W 72/0446* (2013.01)

(56) References Cited

U.S. PATENT DOCUMENTS

| | | | |
|---|---|---|---|
| 11,705,995 | B2 | 7/2023 | Wang et al. |
| 2019/0208518 | A1 | 7/2019 | Baldemair et al. |
| 2019/0313386 | A1 | 10/2019 | Hwang et al. |
| 2020/0313809 | A1 | 10/2020 | Park et al. |
| 2022/0271873 | A1 | 8/2022 | Gao et al. |
| 2022/0377717 | A1 | 11/2022 | Park et al. |
| 2023/0163887 | A1 | 5/2023 | Cheng et al. |
| 2023/0292329 | A1* | 9/2023 | Karaki ................. H04L 1/1854 |
| 2024/0080856 | A1* | 3/2024 | Wang .................... H04L 1/1854 |

FOREIGN PATENT DOCUMENTS

| | | |
|---|---|---|
| CN | 111052654 | 4/2020 |
| KR | 10-2014-0124006 | 10/2014 |
| KR | 10-2020-0096129 | 8/2020 |
| WO | WO 2019/215928 | 11/2019 |

OTHER PUBLICATIONS

3GPP, "3rd Generation Partnership Project; Technical Specification Group Radio Access Network; NR; Physical layer procedures for control (Release 16)," TS 38.213 V16.3.0, Sep. 2020, 179 pages.

ASUSTeK, "Discussion on multi-cell PDSCH scheduling via a single DCI," 3GPP TSG RAN WG1 #102, R1-2006583, e-Meeting, Aug. 17-28, 2020, 2 pages.

CATT, "Remaining details of NR CA operation," 3GPP TSG RAN WG1 Meeting #92, R1-1801740, Athens, Greece, Feb. 26-Mar. 2, 2018, 6 pages.

CATT, "Remaining issues on UCI enhancements," 3GPP TSG RAN WG1 #101, R1-2003621, e-Meeting, May 25-Jun. 5, 2020, 18 pages.

Extended European Search Report in European Appln No. 21880575.2, mailed on May 4, 2023, 8 pages.

Huawei et al., "Corrections on UCI enhancement," 3GPP TSG RAN WG1 Meeting #101-e, R1-2003528, E-meeting, May 25-Jun. 5, 2020, 12 pages.

International Search Report and Written Opinion in International Appln. No. PCT/KR2021/014329, dated Feb. 7, 2022, 12 pages (with English translation).

Nokia & Nokia Shanghai Bell, "On Type-1 HARQ-ACK CB supporting different numerology between PDSCH and PUCCH," R1-1811825, Presented at 3GPP TSG-RAN WG1 Meeting #94b, Chengdu, China, Oct. 8-12, 2018, 4 pages.

Nokia & Nokia Shanghai Bell, "Remaining aspects of NR CA," R1-1804763, Presented at 3GPP TSG RAN WG1 Meeting #92bis, Sanya, China, Apr. 16-20, 2018, 6 pages.

Notice of Allowance in Korean Appln. No. 10-2022-7018224, mailed on Oct. 5, 2023, 5 pages (with English translation).

NTT Docomo, Inc., "DL/UL scheduling and HARQ management," 3GPP TSG RAN WG1 Meeting #92, R1-1802487, Athens, Greece, Feb. 26-Mar. 2, 2018, 2 pages.

Office Action in Chinese Appln. No. 202180036660.3, mailed on May 23, 2024, 15 pages (with English translation).

Office Action in Chinese Appln. No. 202180036660.3, mailed on Oct. 31, 2024, 6 pages (with English translation).

Office Action in Japanese Appln. No. 2022-560130, mailed on Jun. 27, 2023, 6 pages (with English translation).

OPPO, "HARQ enhancements for NR-U," 3GPP TSG RAN WG1 #98bis, R1-1910792, Chongqing, China, Oct. 14-20, 2019, 7 pages.

Qualcomm Incorporated, "MAC Scheduling Aspects of Multi-TTI Grant," 3GPP TSG RAN WG2 Meeting #108, R2-1914773, Reno, NV, USA, Nov. 18-22, 2019, 3 pages.

* cited by examiner

UL grant-to-PUSCH offset (K2)

|  | PUSCH DM-RS |
|---|---|
|  | HARQ-ACK RE |
|  | CSI part 1 |
|  | CSI part 2 |
|  | UL-SCH |

FIG. 16

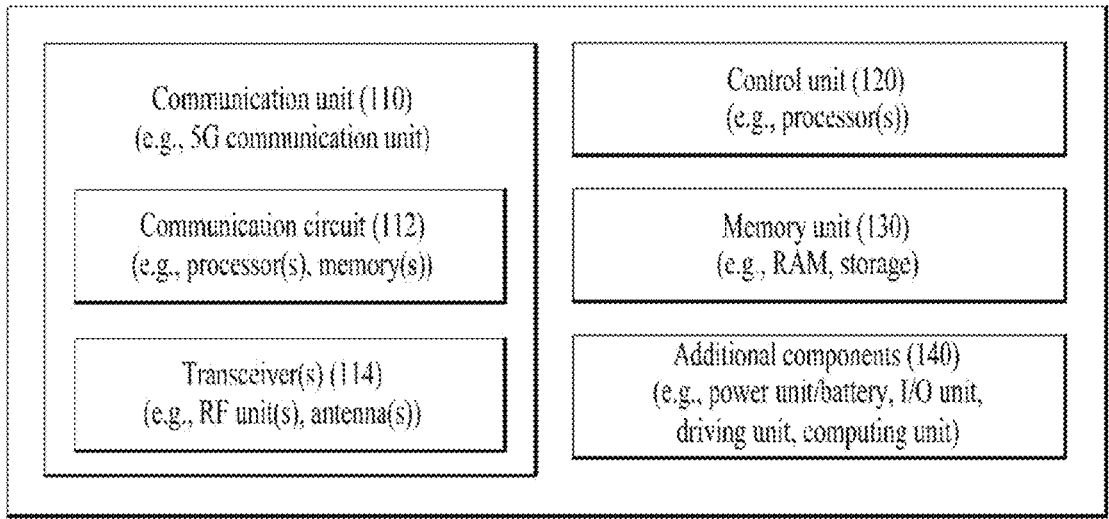

Device(100, 200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 17

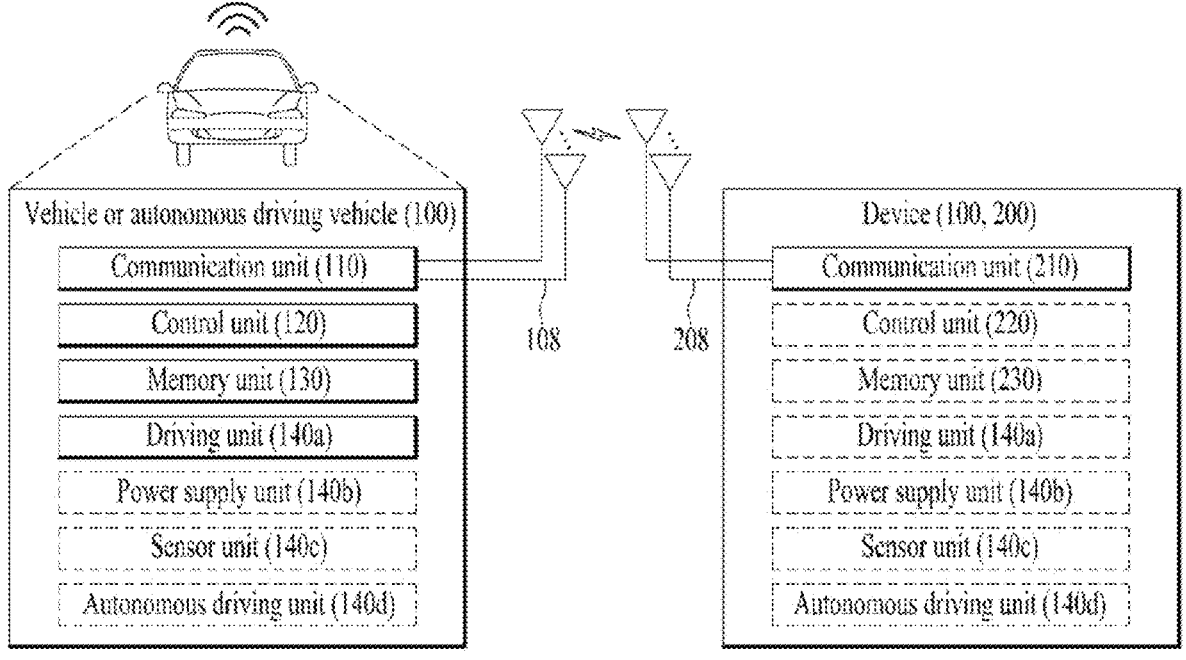

Vehicle or autonomous driving vehicle (100)
Communication unit (110)
Control unit (120)
Memory unit (130)
Driving unit (140a)
Power supply unit (140b)
Sensor unit (140c)
Autonomous driving unit (140d)

108          208

Device (100, 200)
Communication unit (210)
Control unit (220)
Memory unit (230)
Driving unit (140a)
Power supply unit (140b)
Sensor unit (140c)
Autonomous driving unit (140d)

1

METHOD AND DEVICE FOR TRANSMITTING AND RECEIVING SIGNAL IN WIRELESS COMMUNICATION SYSTEM

CROSS-REFERENCE TO RELATED APPLICATIONS

This application is a continuation of U.S. application Ser. No. 17/789,385, filed on Jun. 27, 2022, which is a National Stage application under 35 U.S.C. § 371 of International Application No. PCT/KR2021/014329, filed on Oct. 15, 2021, which claims the benefit of U.S. Provisional Application No. 63/233,317, filed on Aug. 15, 2021, Korean Application No. 10-2021-0103311, filed on Aug. 5, 2021, Korean Application No. 10-2021-0059531, filed on May 7, 2021, U.S. Provisional Application No. 63/174,017, filed on Apr. 12, 2021, Korean Application No. 10-2021-0044258, filed on Apr. 5, 2021, Korean Application No. 10-2021-0006276, filed on Jan. 15, 2021, and U.S. Provisional Application No. 63/092,487, filed on Oct. 15, 2020. The disclosures of the prior applications are hereby incorporated by reference herein in their entirety.

TECHNICAL FIELD

The present disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of receiving a signal by a user equipment (UE) in a wireless communication system may include receiving downlink control information (DCI) scheduling a plurality of physical downlink shared channels (PDSCHs), performing PDSCH reception for at least part of the plurality of PDSCHs based on the DCI, determining a specific codebook-based hybrid automatic repeat request (HARQ)-acknowledgment (ACK), based on a result of the PDSCH reception, and transmitting the HARQ-ACK in slot #N related to a specific candidate PDSCH-to-HARQ feedback timing value (K1 value) indicated by the DCI among a plurality of candidate K1 values configured for the UE.

In the determination of the HARQ-ACK, based on that a first-type codebook-based HARQ-ACK is configured for the scheduling of the plurality of PDSCHs the UE may, perform first start symbol and length indicator value (SLIV) pruning based on a combination of SLIV values of PDSCHs which can be potentially scheduled in each slot of a bundling window determined based on the plurality of candidate K1 values, and perform second SLIV pruning based on a combination of SLIV values of PDSCHs which can be potentially scheduled in at least one slot not belonging to the bundling window.

The first ACK/negative-ACK (NACK) sub-payload for each slot of the bundling window may be determined based on the first SLIV pruning Second ACK/NACK sub-payload for the at least one slot not belonging to the bundling window may be determined based on the second SLIV pruning.

The UE may generate a total payload of the first-type codebook-based HARQ-ACK by concatenating the first ACK/NACK sub-payload and the second ACK/NACK sub-payload, or arranging the first ACK/NACK sub-payload and the second ACK/NACK sub-payload based on a time order of corresponding slots.

The at least one slot not belonging to the bundling window, for which the second SLIV pruning is performed, may be located before the bundling window in a time domain.

The at least one slot not belonging to the bundling window, for which the second SLIV pruning is performed, may be a slot in which a PDSCH located outside the bundling window among the plurality of PDSCHs is received.

A time domain resource allocation (TDRA) field included in the DCI may indicate one row of a TDRA table configured for the UE.

At least one row of the TDRA table may include a plurality of {K0, PDSCH mapping type, SLIV} parameter sets, where 'K0' may indicate a physical downlink control channel (PDCCH)-to-PDSCH slot offset.

The at least one slot not belonging to the bundling window, for which the second SLIV pruning is performed, may be determined based on 'K0' included in a parameter set that does not correspond to a last slot in each row of the TDRA table.

The bundling window for which the first SLIV pruning is performed may be determined by combining the plurality of candidate K1 values with a parameter set corresponding to the last slot in each row of the TDRA table.

The HARQ-ACK may be generated for a valid PDSCH except for an invalid PDSCH overlapping with an uplink (UL) symbol configured by higher-layer signaling, among the plurality of PDSCHs.

The UE may perform each of the first SLIV pruning and the second SLIV pruning while excluding an invalid PDSCH overlapping with a UL symbol configured by higher-layer signaling.

According to an aspect of the present disclosure, a computer-readable recording medium recording a program for performing the above signal reception method may be provided.

According to an aspect of the present disclosure, a UE for performing the above signal reception method may be provided.

According to an aspect of the present disclosure, a device for controlling a UE for performing the above signal reception method may be provided.

According to an aspect of the present disclosure, a method of transmitting a signal by a BS in a wireless communication system may include transmitting DCI scheduling a plurality of PDSCHs, performing PDSCH transmission for at least part of the plurality of PDSCHs based on the DCI, receiving an HARQ-ACK in slot #N related to a specific candidate PDSCH-to-HARQ feedback timing value (K1 value) indicated by the DCI among a plurality of candidate K1 values configured for a UE, and determining a PDSCH to be retransmitted by processing the received HARQ-ACK.

In the determination of the PDSCH to be retransmitted, based on that a first-type codebook-based HARQ-ACK is configured for the scheduling of the plurality of PDSCHs, the BS may perform first SLIV pruning based on a combination of SLIV values of PDSCHs which can be potentially scheduled in each slot of a bundling window determined based on the plurality of candidate K1 values, and perform second SLIV pruning based on a combination of SLIV values of PDSCHs which can be potentially scheduled in at least one slot not belonging to the bundling window.

According to an aspect of the present disclosure, a BS for performing the above signal reception method may be provided.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIGS. 14 to 17 illustrate an example of a communication system 1 and wireless devices applied to the present disclosure.

DETAILED DESCRIPTION

Figure 1:
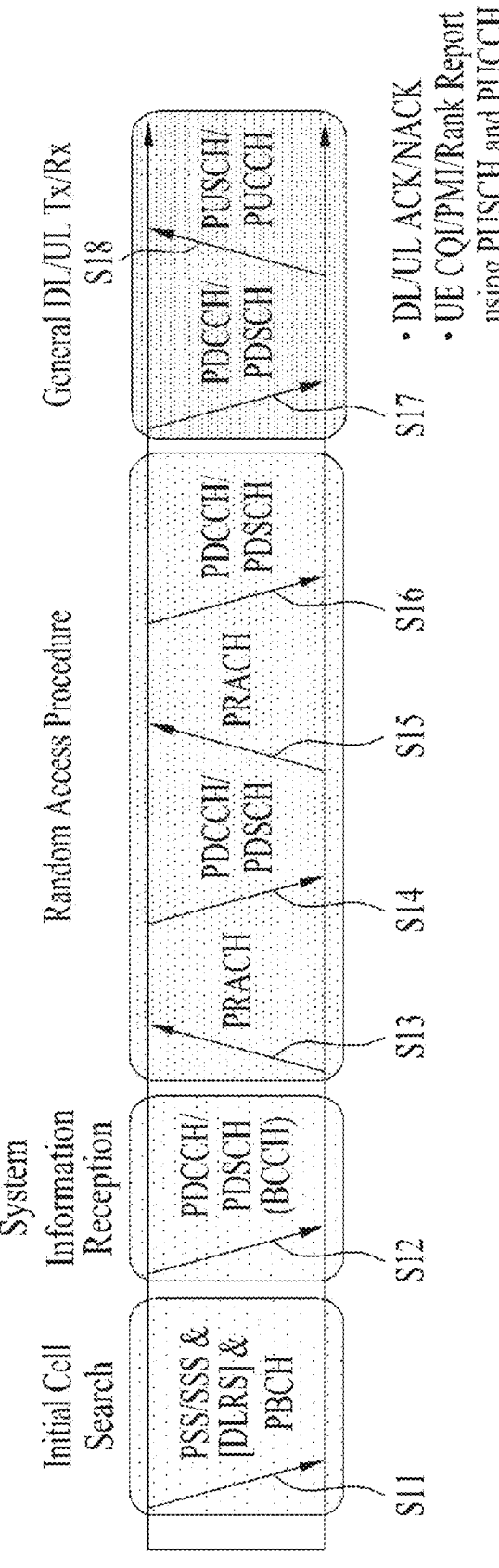
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least part of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
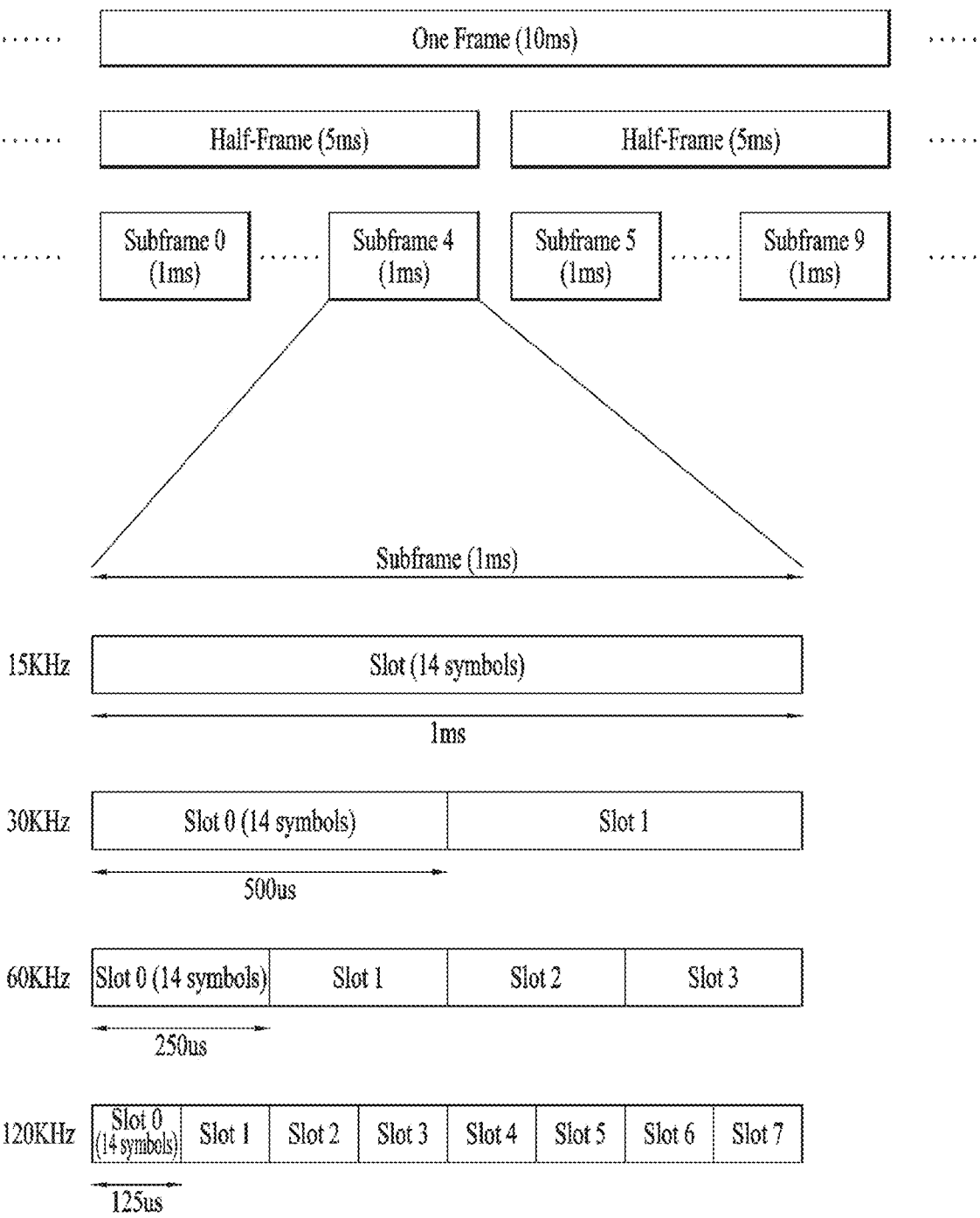
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
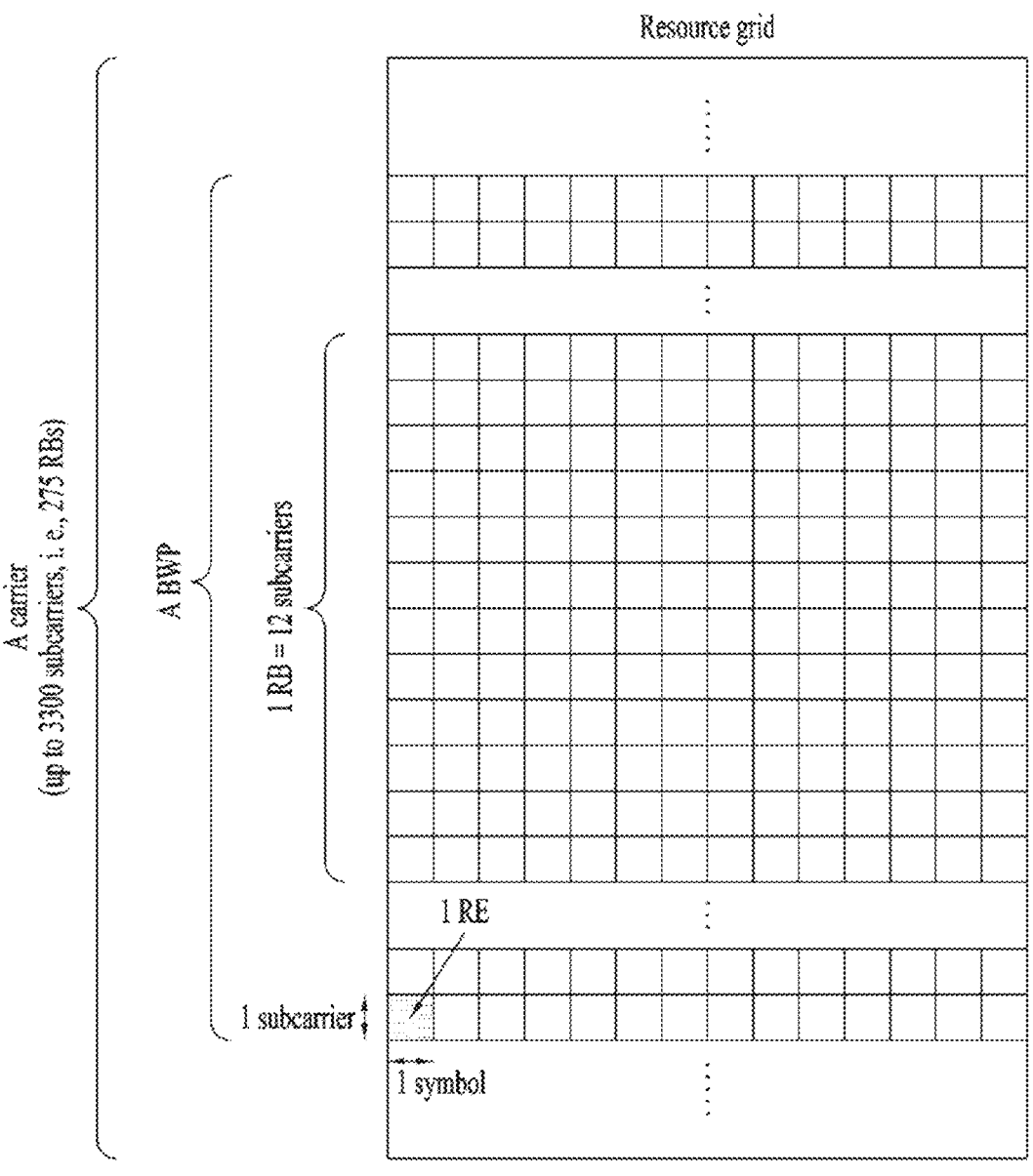
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
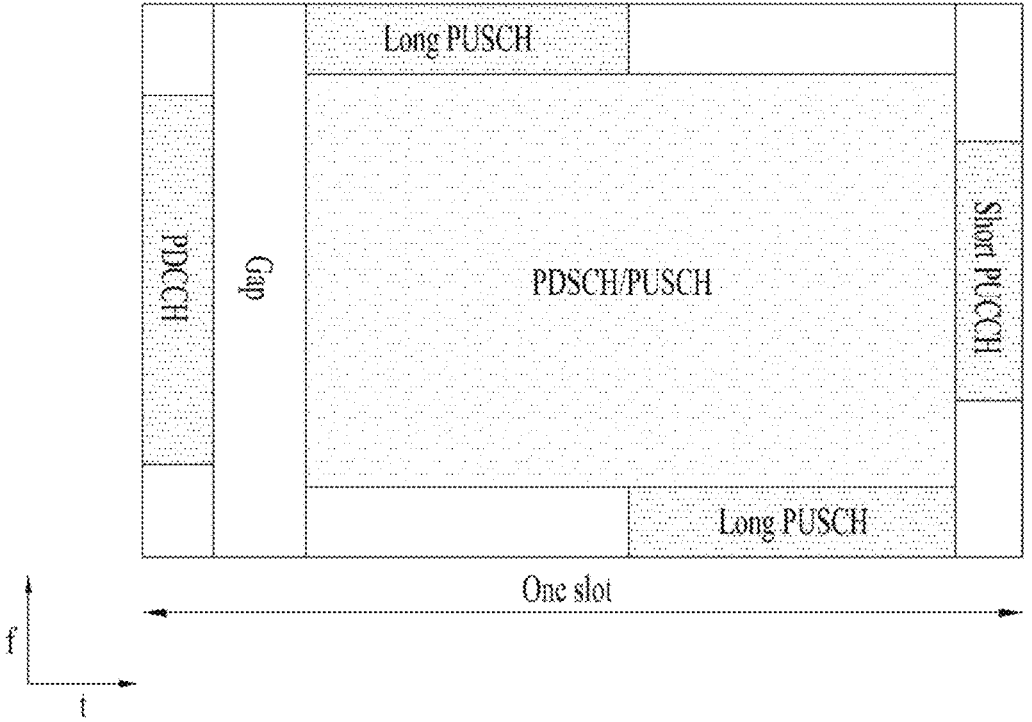
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicity AndOffset: A PDCCH monitoring periodicity (in slots) and a PDCCH monitoring offset (in slots).

monitoringSymbols WithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each $AL=\{1, 2, 4, 8, 16\}$.

* An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level)

PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

System information (SIB1) broadcast in a cell includes cell-specific PDSCH configuration information, PDSCH-ConfigCommon. PDSCH-ConfigCommon includes a list of parameters (or a look-up table) related to a time-domain resource allocation for a PDSCH, pdsch-TimeDomainAllocationList. pdsch-TimeDomainAllocationList may include up to 16 entries (or rows) each having {K0, PDSCH mapping type, PDSCH start symbol and length (SLIV)} which are jointly encoded. Aside from (additionally to) pdsch-TimeDomainAllocationList configured by PDSCH-ConfigCommon, pdsch-TimeDomainAllocationList may also be provided by a UE-specific PDSCH configuration, PDSCH-Config. UE-specifically configured pdsch-TimeDomainAllocationList may have the same structure as UE-commonly configured pdsch-TimeDomainAllocationList. For K0 and SLIV of pdsch-TimeDomainAllocationList, the following description including that of FIG. 5 may be referred to.

DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
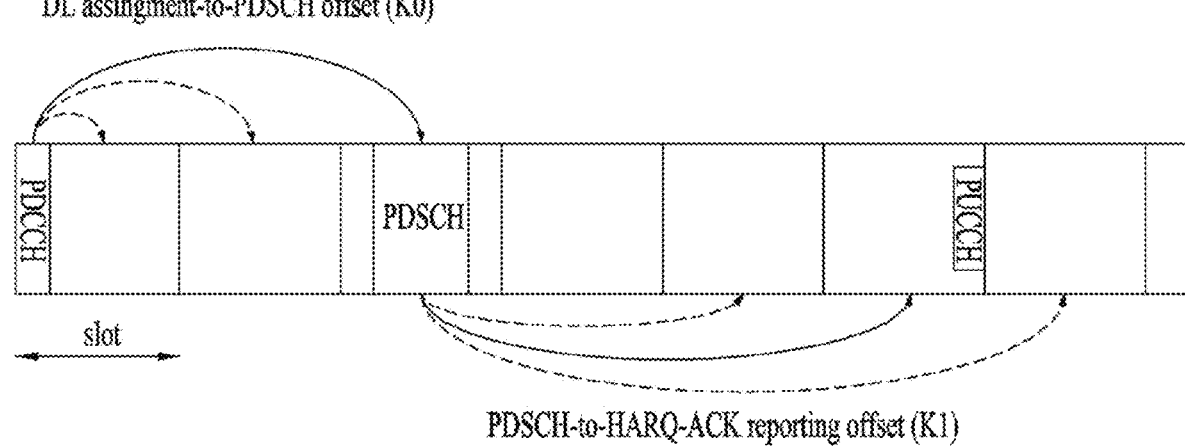
FIG. 5 illustrates an exemplary acknowledgment/negative acknowledgment (ACK/NACK) transmission process.

FIG. 5 illustrates an exemplary PDSCH reception and ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot. As described above, a row index of pdsch-TimeDomainAllocationList provided UE-commonly or UE-specifically may be indicated by a TDRA field.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figures 6, 7:
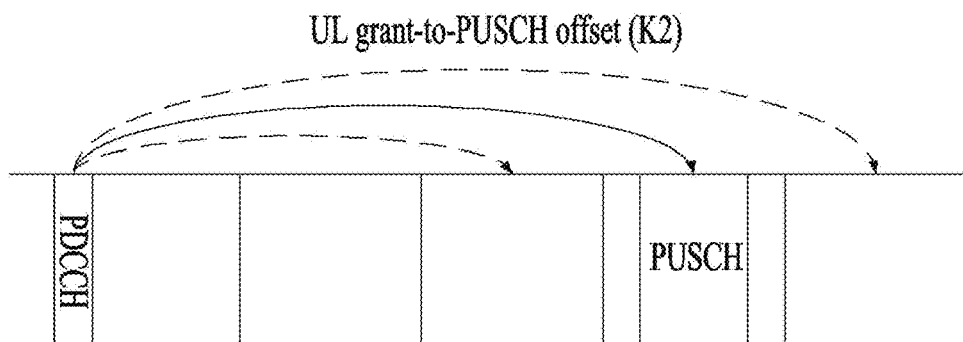
FIG. 6 illustrates an exemplary physical uplink shared channel (PUSCH) transmission process.
FIG. 7 illustrates an example of multiplexing control information in a PUSCH.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV).

The UE may then transmit a PUSCH in slot #(n+K2) according to the scheduling information in slot #n. The PUSCH includes a UL-SCH TB.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

In an NR Rel. 15/16 system, three HARQ-ACK codebook types are defined depending on how an HARQ-ACK bit (payload) is configured: Type 1, Type 2, and Type 3. In the Type-1 codebook, HARQ-ACK payload is configured according to a combination of a candidate HARQ-ACK timing (K1) set and a candidate PDSCH occasion (SLIV) set (configured for a corresponding cell on a cell basis) (e.g., a codebook of a semi-static fixed length based on RRC signaling). In a Type-2 codebook, a codebook size may be changed dynamically according to the number of actually scheduled PDSCHs or the number (e.g., DAI) of corresponding resource allocations. In a Type-3 codebook, HARQ-ACK payload is configured by mapping an HARQ-ACK bit to a corresponding HARQ process number (HPN) on an HPN basis according to the maximum number of HARQ processes (configured for a corresponding cell on a cell basis) (e.g., one shot A/N reporting)

Multi-TTI Scheduling and HARQ-ACK Feedback Based on Single DCI

The 3GPP (e.g., Rel-15 and Rel-16) has recently worked on standardization of a 5G system called new RAT (NR). The NR system seeks to support a plurality of logical networks in a single physical system. For this purpose, the NR system is designed to support services (e.g., cMBB, mMTC, and URLLC) having various requirements by performing/modifying an analog/hybrid beamforming operation or the like in consideration of various OFDM numerologics (e.g., OFDM symbol durations, subcarrier spacings (SCSs), and CP lengths), a wide operating frequency range (up to about 50 GHZ), and characteristics of a high frequency band.

In Rel-17, a need for developing an NR (i.e., high frequency (HF) NR) system operating in a high frequency band (e.g., at or above 60 to 70 GHZ) higher than in the legacy Rel-15/16-based NR system is considered. In consideration of a higher frequency and wider bandwidth than in the legacy NR, and radio channel characteristics such as a larger phase noise and/or larger Doppler shift caused by the high frequency band, introduction and application of a new OFDM numerology based on a larger SCS (e.g., 240 KHz, 480 KHz, or 960 KHz) than the SCSs of legacy NR (e.g. the numerology defined in 3GPP TS 38.211, such as 15 KHz, 30 KHz, 60 KHz, and 120 KHz) may be considered.

When a large SCS is used in the HF NR system, the OFDM symbol duration and the slot duration are shortened as much (e.g., when the SCS increases by N times in the frequency domain, the symbol duration and/or the slot duration decreases to 1/N in the time domain). Accordingly, a cell plan to reduce cell coverage as much may be considered. However, otherwise (e.g., when (target) cell coverage is maintained to correspond to a legacy NR level or when the SCS of a system increases from a legacy NR SCS to a large SCS for HF NR, but the (target) cell coverage is not reduced, in inverse proportion to an SCS increase), there may be a need for supplementing the coverage for physical channel/signal transmission (e.g., a scheme that extends/supplements coverage in processing a physical channel/signal, so that a DL physical channel/signal may reach a UE at an edge/boundary of the target cell coverage or a UL physical channel/signal transmitted from the UE located at the edge/boundary of the target cell coverage reaches a BS). In addition, because the use of a large SCS decreases a CP length as much, it is necessary to consider the effect of the delay spread and/or phase noise of a radio channel, and/or a beam switching time.

The term "beam" may be replaced with (beamformed) signal/channel/resource transmitted through a corresponding beam. For example, the index of a beam may be generally expressed as the index of a signal/channel/resource corresponding to the beam. Alternatively, the term "beam" may be replaced with signal/channel/resource that is associated with a beam and thus identifies the beam. When a different Tx beam is configured for each RO, the BS may identify a TX Beam used by the UE through an RO index or SSB index associated with the RO.

Further, when the OFDM symbol and slot durations are reduced due to the use of a large SCS as described above, a transmission/reception operation (e.g., PDCCH monitoring) that the UE is to be performed in one symbol/slot duration requires fast processing, and in consideration of a UE processing burden (related to a PDCCH monitoring period), the introduction of a multi-TTI scheduling scheme may be considered, which simultaneously schedules a plurality of multiplexed PDSCHs (e.g., at least part of the PDSCHs are TDMed) by one DCI.

Accordingly, the present disclosure proposes a method of configuring and signaling/applying multi-TTI (scheduling) DCI field information for simultaneously scheduling multiple PDSCHs (and/or multiple PUSCHs) (each carrying one or more individual TBs), and a method of configuring an HARQ-ACK (i.e., A/N) feedback related to reception of multiple PDSCHs scheduled by the DCI. For example, a frequency band available for scheduling multiple PDSCHs by one DL DCI may include, but not limited to, 120 KHz, 480 kHz, and/or 960 KHz.

While the present disclosure is described in the context of DL grant DCI-based multi-PDSCH scheduling, for convenience of description, those skilled in the art will understand that multi-TTI scheduling is also applied to UL grant DCI-based multi-PUSCH scheduling, not limited to DL grant DCI-based multi-PDSCH scheduling. In other words, the term multi-TTI scheduling may be understood as covering both DL DCI that schedules a plurality of PDSCHs multiplexed in the time domain and UL DCI that schedules a plurality of PUSCHs multiplexed in the time domain.

The meanings of terms as used herein are summarized as follows. To help the understanding of the terms, FIG. 5/6 and its description may be referred to.

K0 (DL assignment-to-PDSCH offset): A slot interval between a DCI transmission slot and a PDSCH transmission slot (scheduled by corresponding DCI).

SLIV (Start and Length Indicator Value): Information about the starting symbol and symbol duration (or ending symbol) of a PDSCH (PDSCH occasion).

Mapping type: Information indicating whether the position of a DMRS symbol of a PDSCH is determined based on a symbol index within a slot duration or within a PDSCH duration.

TDRA (Time Domain Resource Assignment) table: Includes a plurality of {K0, SLIV, mapping type} combinations (configured by RRC) (one combination is mapped to each of a plurality of rows in the table). A specific one row is indicated by DCI.

K1 (PDSCH-to-HARQ_feedback timing indicator): A slot interval between a PDSCH transmission slot and an HARQ-ACK transmission slot (for a corresponding PDSCH reception).

(Proposal 1) Configuration of PDSCH Resource Allocation Field (Proposal 1-A) Configuration of Time-Domain RA (TDRA) Field Information The TDRA field of DL grant DCI may schedule multiple PDSCHs or the TDRA field of UL grant DCI may schedule multiple PUSCHs.

1) Opt 1

A. For each state indicated by the TDRA field of multi-TTI DCI, N entries may be configured based on a (higher-layer signaled) entry composed of {K0, SLIV, mapping type}. N is the number of scheduled PDSCHs, and may have a different value for each TDRA field state (e.g., N>=1). For example, one TDRA field state may be mapped to N entries based on higher-layer signaling, and N PDSCHs may be allocated to consecutive/non-consecutive slots. Those skilled in the art will understand that for a PUSCH, K2 may be provided instead of K0.

2) Opt 2

A. For each state indicated by the TDRA field of multi-TTI DCI, N entries may be configured in the form of {K0, SLIV, mapping type} for the first PDSCH (corresponding to the first entry (index)) and {D, SLIV, mapping type} for the following PDSCHs. D configured for an $n^{th}$ PDSCH may be applied as a slot interval between a previous $(n-1)^{th}$ PDSCH transmission slot and an $n^{th}$ PDSCH transmission slot.

3) Opt 3

A. For each state indicated by the TDRA field of multi-TTI DCI, one K0 value and N entries each including {SLIV, mapping type} may be configured. K0 may be applied to the first PDSCH (corresponding to the first entry (index)), and the following PDSCHs may be sequentially transmitted in consecutive slots (each for one PDSCH) (following the transmission slot of the first PDSCH).

4) Opt 4

A. For each state indicated by the TDRA field of multi-TTI DCI, one K0 value, one D value, and N entries each including {SLIV, mapping type} may be configured. K0 may be applied to the first PDSCH (corresponding to the first entry (index)), and the D value may be applied commonly to the following PDSCHs.

(Proposal 1-B) Configuration of Frequency-Domain RA (FDRA) Field Information

1) Opt 1

A. The size of an RBG which is a resource allocation unit for RBG-based FDRA, and the size of a related FDRA field may be determined/set according to the number of PDSCHs scheduled by multi-TTI DCI.

i. For example, when the number of scheduled PDSCHs is equal to or less than M, the legacy RBG size (e.g., X RBs) and the legacy FDRA field size are maintained. On the contrary, when the number of scheduled PDSCHs is larger than M, the RBG size is larger than the legacy size, X RBs, and thus the FDRA field size may be decreased. (In this case, characteristically M=1).

2) Opt 2

A. A resource granularity for RIV-based FDRA, and the size of a related FDRA field may be determined/set according to the number of PDSCHs scheduled by muti-TTI DCI.

i. For example, when the number of scheduled PDSCHs is equal to or less than M, the legacy RIV method with a 1-RB granularity and the legacy FDRA field size are maintained. On the contrary, when the number of scheduled PDSCHs is larger than M, an RIV method based on a K-RB (K>1) granularity may be used, and thus the FDRA field size may be decreased. (In this case, characteristically M=1).

(Proposal 2) Rate-Matching Indicator (RMI) Field Information

1) Opt 1

A. Rate-matching (pattern) information indicated by an RMI field of multi-TTI DCI may be applied commonly to a plurality of PDSCHs scheduled by the DCI. For example, the DCI may include one RMI field applied commonly to a plurality of PDSCHs.

2) Opt 2

A. Rate-matching (pattern) information indicated by the RMI field of multi-TTI DCI may be applied only to one specific PDSCH (e.g., the first or last PDSCH in time) among a plurality of PDSCHs scheduled by the DCI.

3) Opt 3

A. A PDSCH among a plurality of PDSCHs scheduled by multi-TTI DCI, to which rate-matching (pattern) information indicated by the RMI field of the multi-TTI DCI is to be applied, may be indicated by the same DCI or by the RRC.

(Proposal 3) ZP-CSI-RS Trigger (ZCR) Field Information

1) Opt 1

A. ZP-CSI-RS information (rate-matching information for a ZP-CSI-RS) indicated by a ZCR field of multi-TTI DCI may be applied commonly to all of a plurality of PDSCHs scheduled by the DCI. For example, the DCI may include one ZCR field applied commonly to the plurality of PDSCHs. An aperiodic ZP CSI-RS triggered by the ZCR field may be applied to all slots including the PDSCHs scheduled by the DCI.

2) Opt 2

A. ZP-CSI-RS information (rate-matching information for a ZP-CSI-RS) indicated by the ZCR field of multi-TTI DCI may be applied only to a specific PDSCH (e.g., the first or last PDSCH in time) among a plurality of PDSCHs scheduled by the DCI.

3) Opt 3

A. A PDSCH among a plurality of PDSCHs scheduled by multi-TTI DCI, to which ZP-CSI-RS information (rate-matching information for a ZP-CSI-RS) indicated by the ZCR field of multi-TTI DCI is to be applied, may be indicated by the same DCI or by the RRC.

(Proposal 4) Configuration of NDI, RV, and MCS Fields (Proposal 4-A) Configuration of NDI Field Information 1) Opt 1

A. In a situation in which the maximum number of TBs transmittable on one PDSCH is set to 2, when K or fewer PDSCHs are scheduled by multi-TTI DCI, a 1-bit NDI field may be configured/indicated for each TB (i.e., two 1-bit NDI fields are configured/indicated for each PDSCH). On the contrary, when more than K PDSCHs are scheduled by the multi-TTI DCI, a 1-bit NDI field is configured/indicated for each PDSCH (i.e., two TBs transmitted on one PDSCH are scheduled based on the same one 1-bit (TB-common) NDI value).

B. Regarding the value of K in the above example, K=1 in one example or K=N/2 in another example. In another example, the value of K may be configured by the RRC.

C. In another method, it may be configured by the RRC whether the method of Opt 1 is to be applied or a 1-bit NDI field is configured/indicated for each TB all the time irrespective of the number of scheduled PDSCHs.

D. In another example, when spatial bundling is not configured for an HARQ-ACK feedback, a 1-bit NDI field may be configured/indicated for each TB all the time irrespective of the number of scheduled PDSCHs. When spatial bundling is configured for an HARQ-ACK feedback, the method of Opt 1 may be applied, or a 1-bit (TB-common) NDI field may be configured/indicated for each PDSCH all the time irrespective of the number of scheduled PDSCHs.

E. In another example, when spatial bundling is not configured for an HARQ-ACK feedback, a 1-bit NDI field may be configured/indicated for each TB all the time irrespective of the number of scheduled PDSCHs. When spatial bundling is configured for an HARQ-ACK feedback, it may be configured by the RRC whether the method of Opt 1 is to be applied (or a 1-bit (TB-common) NDI field is configured/indicated for each PDSCH all the time irrespective of the number of scheduled PDSCHs) or a 1-bit NDI field is configured/indicated for each TB all the time irrespective of the number of scheduled PDSCHs.

2) Opt 2

A. In a situation in which the maximum number of TBs transmittable on one PDSCH is set to 2, when K or fewer PDSCHs are scheduled by multi-TTI DCI, up to two TBs are transmittable on each PDSCH (in this case, two 1-bit NDI fields are configured/indicated for each PDSCH, that is, a 1-bit NDI field is configured/indicated for each TB (each of two TBs) transmittable on the PDSCH). On the contrary, when more than K PDSCHs are scheduled by the multi-TTI DCI, only one TB is transmittable on each PDSCH (in this case, one 1-bit NDI field may be configured/indicated for each PDSCH by DCI, that is, only a 1-bit NDI field may be configured/indicated for one TB transmittable on the PDSCH).

B. Regarding the value of K in the above example, K=1 in one example or K=N/2 in another example. In another example, the value of K may be configured by the RRC.

C. The operation method of Opt 2 based on K=1 is referred to as "2-TB only for single PDSCH", for convenience.

(Proposal 4-B) Configuration of RV Field Information

1) Opt 1

A. In a situation in which the maximum number of TBs transmittable on one PDSCH is set to 2, when K or fewer PDSCHs are scheduled by multi-TTI DCI, a 2-bit RV field may be configured/indicated for each TB (i.e., two 2-bit RV fields may be configured/indicated for each PDSCH). On the contrary, when more than K PDSCHs are scheduled by the multi-TTI DCI, a 2-bit RV field may be configured/indicated for each PDSCH (i.e., two TBs transmitted on one PDSCH may be scheduled based on the same one 2-bit RV value).

B. Regarding the value of K in the above example, K=1 in one example or K=N/2 in another example. In another example, the value of K may be configured by the RRC.

2) Opt 2

A. In a situation in which the maximum number of TBs transmittable on one PDSCH is set to 2, when K or fewer PDSCHs are scheduled by multi-TTI DCI, a 2-bit RV field may be configured/indicated for each TB (i.e., two 2-bit RV fields may be configured/indicated for each PDSCH). On the contrary, when more than K PDSCHs are scheduled by the multi-TTI DCI, a 1-bit RV field may be configured/indicated for each PDSCH (i.e., two TBs transmitted on one PDSCH may be scheduled based on the same one 1-bit RV value).

B. Regarding the value of K in the above example, K=1 in one example or K=N/2 in another example. In another example, the value of K may be configured by the RRC.

3) Opt 3

A. In a situation in which the maximum number of TBs transmittable on one PDSCH is set to 2, when K or fewer PDSCHs are scheduled by multi-TTI DCI, a 1-bit RV field may be configured/indicated for each TB (i.e., two 1-bit RV fields may be configured/indicated for each PDSCH). On the contrary, when more than K PDSCHs are scheduled by the multi-TTI DCI, a 1-bit RV field may be configured/indicated for each PDSCH (i.e., two TBs transmitted on one PDSCH may be scheduled based on the same one 1-bit RV value).

B. Regarding the value of K in the above example, K=1 in one example or K=N/2 in another example. In another example, the value of K may be configured by the RRC.

4) Opt 4

A. In a situation in which the maximum number of TBs transmittable on one PDSCH is set to 2, when K or fewer PDSCHs are scheduled by multi-TTI DCI, up to 2 TBs are transmittable on each PDSCH (in this case, two 2-bit (or 1-bit) RV fields may be configured/indicated for each PDSCH, that is, a 2-bit (or 1-bit) RV field may be configured/indicated for each TB (each of two TBs) transmittable on the PDSCH). On the contrary, when more than K PDSCHs are scheduled by the multi-TTI DCI, only one TB is transmittable on each PDSCH (in this case, a 1-bit (or 2-bit) RV field may be configured/indicated for each PDSCH, that is, a 1-bit (or 2-bit) RV field may be configured/indicated for one TB transmittable on the PDSCH).

B. Regarding the value of K in the above example, K=1 in one example or K=N/2 in another example. In another example, the value of K may be configured by the RRC.

5) Note

A. In Opt 1/2/3/4, the number of PDSCHs may mean the number of actually transmitted valid PDSCHs except for an invalid PDSCH the transmission of which is skipped/dropped due to overlap with a specific UL symbol (e.g., semi-statically configured by higher-layer signaling such as tdd-UL-DL-ConfigurationCommon or tdd-UL-DL-ConfigurationDedicated), or the total number of PDSCHs indicated by multi-TTI DCI irrespective of whether the PDSCHs are actually transmitted.

B. In another example, when a plurality of PDSCHs (or PUSCHs) are scheduled by multi-TTI DCI (e.g., a state composed of/configured with a plurality of SLIVs is indicated by the TDRA field), it may be regulated that the number of actually transmitted valid PDSCHs (or PUSCHs) except for invalid PDSCHs (or PUSCHs) whose transmissions are dropped due to overlap in time with a specific (e.g., semi-statically configured) UL (or DL) symbol among the plurality of PDSCHs (or PUSCHs) is always 2 or larger (the UE may expect/assume such scheduling from the BS). Otherwise, when the number of valid PDSCHs (or PUSCHs) is less than 2, the UE may discard the multi-TTI DCI, considering that the multi-TTI DCI is an inconsistent PDCCH.

C. When an SCell dormancy indication is performed, which indicates switching to a dormant BWP configured to allow the UE to skip PDCCH monitoring in a specific SCell without PDSCH scheduling by legacy single-TTI DCI, 3 bits corresponding to a 1-bit NDI and a 2-bit RV in the DCI is reinterpreted as a part of SCell dormancy indication information.

When an SCell dormancy indication is performed without PDSCH scheduling by multi-TTI DCI, Alt 1) a 1-bit DNI and a 2-bit RV configured to correspond to one indicated PDSCH under the constraint that only one PDSCH (e.g., a single SLIV) is always indicated by the TDRA field of the DCI may be reinterpreted as SCell dormancy indication information, Alt 2) the first or last 3 bits of a total bit set including (one or) a plurality of NDI fields and RV fields corresponding to (one or) a plurality of PDSCHs indicated by the DCI without the constraint of Alt 1 may be reinterpreted as SCell dormancy indication information, or Alt 3) the first or last one bit of (one or) a plurality of NDI field sets corresponding to (one or) a plurality of PDSCHs and the first or last 2 bits of (one or) a plurality of RV field sets corresponding to the (one or) plurality of PDSCHs indicated by the DCI without the constraint of Alt 1 may be reinterpreted as SCell dormancy indication information.

(Proposal 4-C) Configuration of MCS Field Information

1) Opt 1

A. In a situation in which the maximum number of TBs transmittable on one PDSCH is set to 2, when K or fewer PDSCHs are scheduled by multi-TTI DCI, up to two TBs are transmittable on each PDSCH (in this case, two MCS fields may be configured/indicated for each PDSCH by the DCI, that is, an MCS field may be configured/indicated for each TB (each of two TBs) transmittable on the PDSCH), whereas when more than K PDSCHs are scheduled by the multi-TTI DSCI, only one TB is transmittable on each PDSCH (in this case, one MCS field may be configured/indicated for each PDSCH by the DCI, that is, only an MCS field may be configured/indicated for one TB transmittable on the PDSCH).

B. Regarding the value of K in the above example, K=1 in one example or K=N/2 in another example. In another example, the value of K may be configured by the RRC.

2) Note

A. When more than K PDSCHs are scheduled by multi-TTI DCI, only one TB is transmittable on each PDSCH based on the above proposals. Accordingly, the numbers of MCS fields, RV fields, and NDI fields configured/indicated by the DCI are reduced. In this case, unused MCS/RV/NDI bits may be used to indicate other information.

B. For example, in a state in which a plurality of PDSCHs (more than K PDSCHs) scheduled by one multi-TTI DCI have been grouped into a plurality of (e.g., 2) groups, an HARQ-ACK feedback corresponding to each individual group may be transmitted by applying/using an HARQ-ACK timing and a PUCCH resource indicated by individual K1 and PRI fields for the group. Unused MCS/RV/NDI bits may be used to configure (individual) K1 and PRI fields on a group basis.

(Proposal 5) Configuration of HARQ Process ID Information

1) Opt 1

A. When some specific of a plurality of PDSCHs scheduled by multi-TTI DCI overlap with specific UL symbol(s) (e.g., UL symbol(s) statically configured by higher-layer signaling such as tdd-UL-DL-ConfigurationCommon or tdd-UL-DL-ConfigurationDedicated), transmission and reception of the specific PDSCH(s) may be skipped/dropped. In this case, consecutive HARQ process IDs starting from an HARQ process ID indicated by the DCI may be allocated sequentially in time only to actually transmitted/received PDSCH(s) (instead of the scheduled PDSCHs). For example, on the assumption that a single DL grant DCI schedules 8 PDSCHs and two PDSCHs collide with a UL symbol and thus are dropped, 6 consecutive HARQ process IDs {HARQ process ID #n+1 to HARQ process ID #n+6} may be sequentially allocated to a total of 6 valid PDSCHs.

Figure 8:
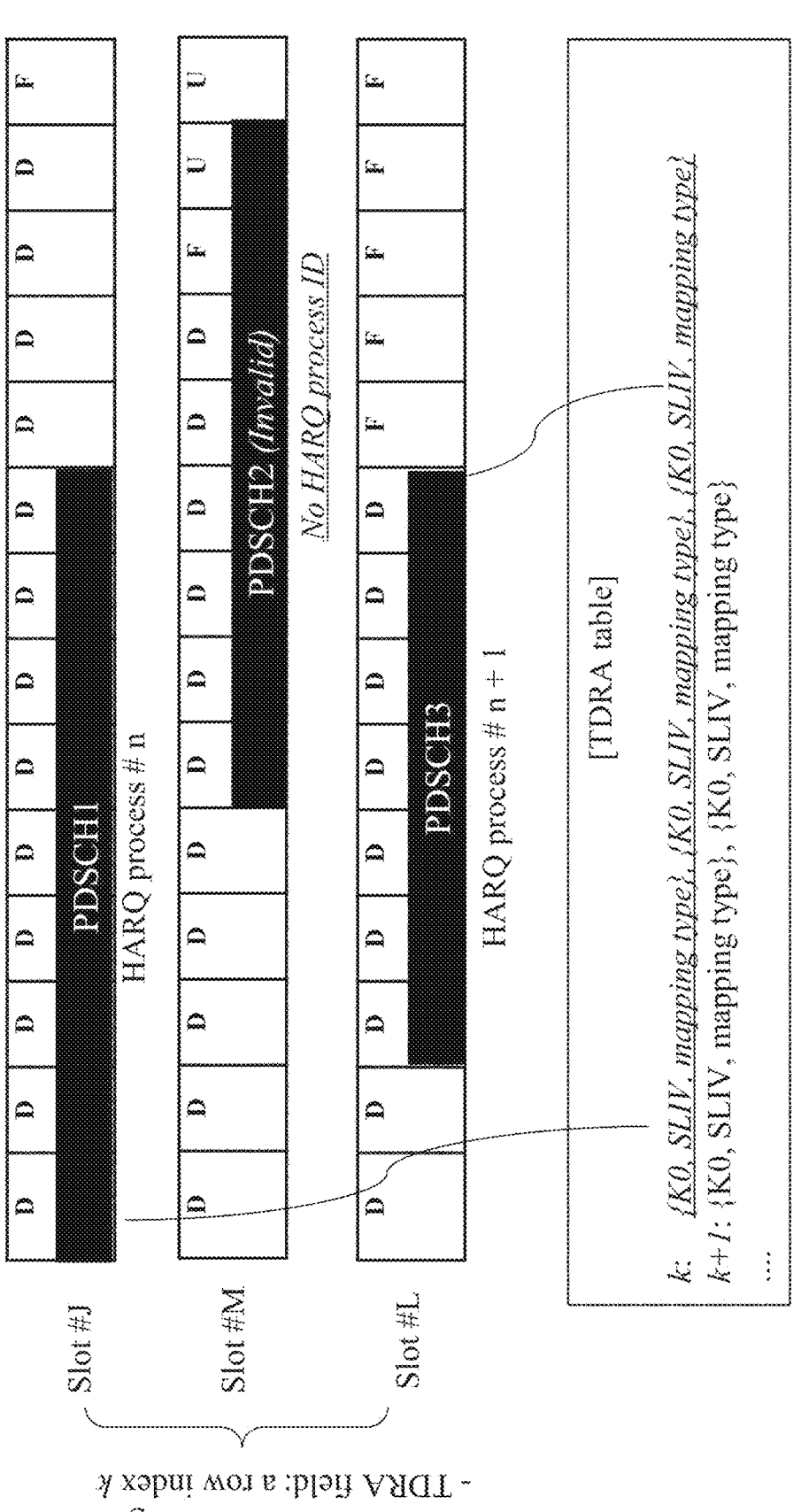
FIG. 8 illustrates hybrid automatic repeat request (HARQ)-process identifier (ID) allocation for multi-transmission time interval (TTI) scheduling according to an embodiment of the present disclosure.

FIG. 8 illustrates exemplary HARQ-process ID allocation for multi-TTI scheduling. Referring to FIG. 8, it is assumed that a TDRA field indicates row index k and an HARQ process ID field indicates n in DCI. In a TDRA table, an indexed row includes a total of three SLIV values corresponding to PDSCH 1, PDSCH 2, and PDSCH3 (in time order). Because an SLIV value for PDSCH 2 overlaps with a U symbol, PDSCH 2 becomes an invalid PDSCH. Therefore, HARQ process IDs are sequentially/continuously allocated only to valid PDSCH 1 and PDSCH 3 except for the invalid PDSCH.

Accordingly, regarding the NDI and RV fields corresponding to each PDSCH, consecutive NDI/RV fields starting from the last (or first) NDI/RV field in the DCI may correspond in time only to the actually transmitted/received PDSCH(s).

Similarly, UL grant DCI may sequentially allocate HARQ process IDs to valid PUSCHs, except for invalid PUSCHs that collide with a semi-statically configured DL symbol and thus are dropped.

2) Opt 2

When some specific of a plurality of PDSCHs scheduled by multi-TTI DCI overlap with a specific (e.g., semi-statically configured) UL symbol, transmission and reception of the specific PDSCH(s) may be dropped. In this case, consecutive HARQ process IDs starting from an HARQ process ID indicated by the DCI may be allocated to all PDSCH(s) scheduled by the DCI in time order regardless of whether the PDSCH(s) are actually transmitted/received.

A. Accordingly, consecutive NDI/RV fields starting from the last (or first) NDI/RV field in the DCI may correspond to all PDSCH(s) scheduled by the DCI in time order, regardless of whether the PDSCH(s) is actually transmitted/received.

3) Note

A. When some specific of a plurality of PUSCHs scheduled with multi-TTI DCI overlap with a specific (e.g., semi-statically configured) DL symbol, the above methods may also be applied equally by determining an HARQ process ID and a corresponding NDI/RV field for each PUSCH.

B. To prevent complexity/ambiguity in determining NDI/RV, CBGTI/CBGFI, HARQ-ACK timing, and PDSCH TCI/QCL information as well as HARQ process IDs and configuring corresponding fields, it may be regulated that the first of a plurality of PDSCHs/PUSCHs scheduled/indicated by multi-TTC DCI is always scheduled/indicated as a valid PDSCH/PUSCH that does not overlap with a specific (e.g., semi-statically configured) UL/DL symbol by the DCI (the UE assumes such scheduling). Accordingly, when the first PDSCH/PUSCH scheduled/indicated by the multi-TTI DCI overlaps with the specific (e.g., semi-statically configured) UL/DL symbol, the UE may discard the DCI (considering the DCI as an inconsistent PDCCH).

(Proposal 6) Configuration of CBGTI and CBGFI Field Information

1) Opt 1

A. In a situation in which a PDSCH transmissions based on up to M CB groups (CBGs) is configured, when K or fewer PDSCHs are scheduled by multi-TTI DCI, an M-bit CBG transmission indicator (CBGTI) field and a 1-bit CBG flush indicator (CBGFI) field may be configured/indicated for each PDSCH, whereas when more than K PDSCHs are scheduled by the multi-TTI DCI, neither the CBGTI field nor the CBGFI field may be configured/indicated (i.e., all scheduled PDSCHs may be transmitted at a TB level (not based on a CBG)).

B. Regarding the value of K in the above example, K=1 in one example or K=N/2 in another example. In another example, the value of K may be configured by the RRC.

C. The operation method of Opt 1 based on K=1 is referred to as "CBG only for single PDSCH", for convenience.

2) Opt 2

A. In a situation in which a PDSCH transmissions based on up to M CBGs is configured, when K or fewer PDSCHs are scheduled by multi-TTI DCI, only one 1-bit CBGFI field may be configured/indicated, and an M-bit CBGTI field may be configured/indicated for each PDSCH, whereas when more than K PDSCHs are scheduled by the multi-TTI DCI, neither the CBGTI field nor the CBGFI field may be configured/indicated (i.e., all scheduled PDSCHs may be transmitted at a TB level (not based on a CBG)).

B. A value indicated by the single 1-bit CBGFI field may be commonly applied to all of a plurality of scheduled PDSCHs, or only to a specific one (e.g., the first or last one in time) of the plurality of PDSCHs.

C. Regarding the value of K in the above example, K=2 in one example or K=N/2 in another example. In another example, the value of K may be configured by the RRC.

3) Note

A. In Opt 1/2, the number of PDSCHs may mean the number of valid PDSCHs which are actually transmitted, except for invalid PDSCHs which overlap with a specific (e.g., semi-statically set) UL symbol and the transmissions of which are dropped, or may mean the total number of PDSCHs indicated by multi-TTI DCI regardless of whether they are actually transmitted.

B. Based on the above proposals, the size or the presence or absence of a specific field (e.g., NDI, RV, MCS, CBGTI, CBGFI, or the like) in multi-TTI DCI may be determined differently depending on whether the number of PDSCHs scheduled by the DCI is equal to or less than K, or greater than K, and as different K values are defined/set between specific fields, a total of L different K values $\{K\_1, \ldots, K\_L\}$ may exist.

i. Alternatively, the same K value may be defined/set between the specific fields, and thus L=1.

C. Additionally, on the assumption that the maximum number of PDSCHs that may be indicated/scheduled by the TDRA field of multi-TTI DCI is K_max, a total of L+1 different K values $\{K\_1, \ldots, K\_L, K\_max\}$ may exist.

D. Accordingly, a total DCI payload size may be calculated on the assumption that as many PDSCHs as a corresponding K value are scheduled (by multi-TTI DCI), for each of the L+1 different K values $\{K\_1, \ldots, K\_L, K\_max\}$, and the maximum of the calculated DCI payload sizes corresponding to the L+1 K values may be determined as a final payload size of the multi-TTI DCI (format).

(Proposal 7) Signaling of DAI Field Information (Configuration of Type-2 A/N Codebook Based on the Signaling)

1) Signaling of Counter-DAI and Total-DAI in DL DCI

A. A case in which one PDSCH is scheduled by any DCI (e.g., existing single-TTI DCI or multi-TTI DCI) is defined as a single PDSCH case, and a case in which a plurality of PDSCHs are scheduled by multi-TTI DCI is defined as a multiple PDSCH case. Then, a counter/total-DAI value may be independently determined and signaled for each of the single PDSCH case and the multiple PDSCH case (i.e., DCI/PDSCH sequence/sum scheduled for each case may be independently determined/signaled).

B. In other words, DCI corresponding to the single PDSCH case may determine and signal a DAI value only for the single PDSCH case, and DCI corresponding to the multiple PDSCH case may determine and signal a DAI value only for the multiple PDSCH case. In other words, a C-DAI/T-DAI related to the single PDSCH case may be counted within DCI(s) related to the single PDSCH case, and a C-DAI/T-DAI related to the multiple PDSCH case may be counted within DCI(s) related to the multiple PDSCH case.

C. The number of A/N bits corresponding to one DAI in the multiple PDSCH case may be determined based on the maximum number of TBs (including a case where spatial bundling is not configured) or the maximum number of PDSCHs (including a case in which spatial bundling is configured), which may be scheduled by any (serving cell) multi-TTI DCI.

D. The above-described method may be applied to a situation in which a CBG-based PDSCH transmission is not configured.

2) Signaling of UL (Total) DAI in UL DCI

A. A UL DAI value may be signaled for each of the single PDSCH case and the multiple PDSCH cases (i.e., two UL DAI values may be signaled by one DCI, indicating total-DAI information for the single PDSCH case and total-DAI information for the multiple PDSCH case, respectively).

B. The above-described method may be applied to a situation in which a CBG-based PDSCH transmission is not configured.

3) DAI Signaling in Situation in which CBG-Based PDSCH Transmission is Configured A. A case in which a CBG-based PDSCH transmission is scheduled by specific DCI (e.g., DCI including a CBGTI field/signaling) is defined as a CBG PDSCH case, a case in which one TB-based PDSCH transmission (i.e., one PDSCH transmission based on a TB) is scheduled by any DCI is defined as a single PDSCH case, and a case in which a plurality of (TB-based) PDSCH transmissions (i.e., a plurality of TB-based PDSCH transmissions) are scheduled by multi-TTI DCI is defined as a multiple PDSCH case. Then, a counter/total-DAI value may be determined/signaled in the following manner.

B. Opt 1: A counter/total-DAI value may be determined and signaled independently for each of the three cases, that is, the single PDSCH case, the multiple PDSCH case, and the CBG PDSCH case. Regarding a UL DAI, a UL DAI value may be signaled for each of the above-described three cases (the single PDSCH case, the multiple PDSCH case, and the CBG PDSCH case) by DCI.

C. Opt 2: If the multiple PDSCH case and the CBG PDSCH case are collectively defined as a multi-A/N PDSCH case, a counter/total-DAI value may be determined and signaled independently for each of the two cases, that is, the single PDSCH case and the multi-A/N PDSCH case.

D. In the case of Opt 2, DCI corresponding to the single PDSCH may signal a determined DAI value only for the single PDSCH case, and DCI corresponding to the multi-A/N PDSCH case (i.e., the multiple PDSCH case or the CBG PDSCH case) may signal a determined DAI value only for the multi-A/N PDSCH case (i.e., the multiple PDSCH case and the CBG PDSCH case).

E. In the multi-A/N PDSCH case, when the maximum number of TBs (including the case where spatial bundling is not configured) or the maximum number of PDSCHs (including the case where spatial bundling is configured) schedulable by any multi-TTI DCI (in a serving cell) is defined as A, and the maximum number of CBGs configured for any PDSCH transmission (in a serving cell) is defined as B, the number of A/N bits corresponding to one DAI may be determined based on the larger between A and B.

(Proposal 8) HARQ Timing Field Information (Configuration of Type-1/2 A/N Codebook Based on HARQ Timing Field Information)

1) A/N Timing Determination and A/N Payload Configuration for Type-2 A/N Codebook A. An A/N timing (slot) may be determined by applying a K1 value (indicated by multi-TTI DCI) based on the last (or first) PDSCH transmission slot (in time) among a plurality of PDSCHs scheduled by the DCI, and A/N feedbacks for all of the plurality of PDSCHs scheduled by the DCI may be transmitted at one time at the (same one) A/N timing.

B. Accordingly, a counter/total-DAI value may be determined/signaled only between multi-TTI DCIs indicating the A/N timing corresponding to the last (or first) PDSCH transmission slot as the same slot, and A/N feedbacks for all of a plurality of PDSCHs scheduled by the multi-TTI DCIs (indicating the A/N timing corresponding to the last (or first) PDSCH transmission slot as the same slot) may be multiplexed and transmitted at the same one A/N timing.

C. In the above example, the last (or first) PDSCH may refer to the last (or first) one of actually transmitted valid PDSCHs except for invalid PDSCHs which overlap with a specific (e.g., semi-statically set) UL symbol and thus the transmissions of which are dropped, or the last (or first) one of PDSCHs indicated by multi-TTI DCI regardless of whether they are actually transmitted.

2) A/N Timing Determination and A/N Payload Configuration for Type-1 A/N Codebook A. An A/N timing (slot) may be determined by applying a K1 value (indicated by multi-TTI DCI) based on the last (or first) PDSCH transmission slot (in time) among a plurality of PDSCHs scheduled by the DCI, and A/N feedbacks for all of the plurality of PDSCHs scheduled by the DCI may be transmitted at one time at the (same one) A/N timing.

B. Accordingly, A/N feedbacks (for all of plurality of PDSCHs scheduled by multi-TTI DCIs) may be multiplexed and transmitted at the same one A/N timing only between the multi-TTI DCIs indicating an A/N timing corresponding to the last (or first) PDSCH transmission slot as the same slot (single-TTI DCIs indicating an A/N timing corresponding to the last (or first) PDSCH transmission slot as the same slot).

C. In the above example, the last (or first) PDSCH may refer to the last (or first) one of actually transmitted valid PDSCHs except for invalid PDSCHs which overlap with a specific (e.g., semi-statically set) UL symbol and thus whose transmissions are dropped, or the last (or first) one of PDSCHs indicated by multi-TTI DCI regardless of whether they are actually transmitted.

D. In a state in which a set of a plurality of (e.g., N) candidate K1 values (e.g., a set of PDSCH-to-HARQ feedback timing indicator values which may be indicated by DCI) are set, in the case of the legacy Type-1 codebook, a combination of all PDSCH occasions (SLIVs) transmittable in a DL slot earlier than an A/N transmission slot by K1 DL slots are calculated for each K1 value (configured for a corresponding serving cell on a serving cell basis), and A/N sub-payload corresponding to the corresponding DL slot may be configured (including determination of an A/N bit position/sequence corresponding to each SLIV). (This is defined as "SLIV pruning"). A process of determining combinations of transmittable PDSCH occasions (SLIVs) in SLIV pruning will be described in more detail. One or more non-overlapping PDSCHs may be scheduled for a UE in each DL slot (e.g., index #N-candidate K1 value). The number of non-overlapping PDSCHs (the maximum number of non-overlapping PDSCHs schedulable in the corresponding slot) may be determined based on a combination of configured SLIV values (e.g., a combination of SLIVs configured through pdsch-TimeDomainAllocationList and indicated by the TDRA field of DCI). Based on the SLIV values set for the UE, a process of pruning potential overlapping PDSCHs (i.e., incompatible/mutually exclusive PDSCHs due to overlap are counted as a maximum of one PDSCH transmission), and determining (schedulable/compatible potential) non-overlapping PDSCHs is referred to as SLIV pruning. In the case of the existing Type-1 codebook, A/N sub-payloads configured by the SLIV pruning may be concatenated for N K1 values to configure the entire A/N codebook (e.g., refer to 3GPP TS 38.213 V16.2.0 Section 9.1.2).

Figure 9:
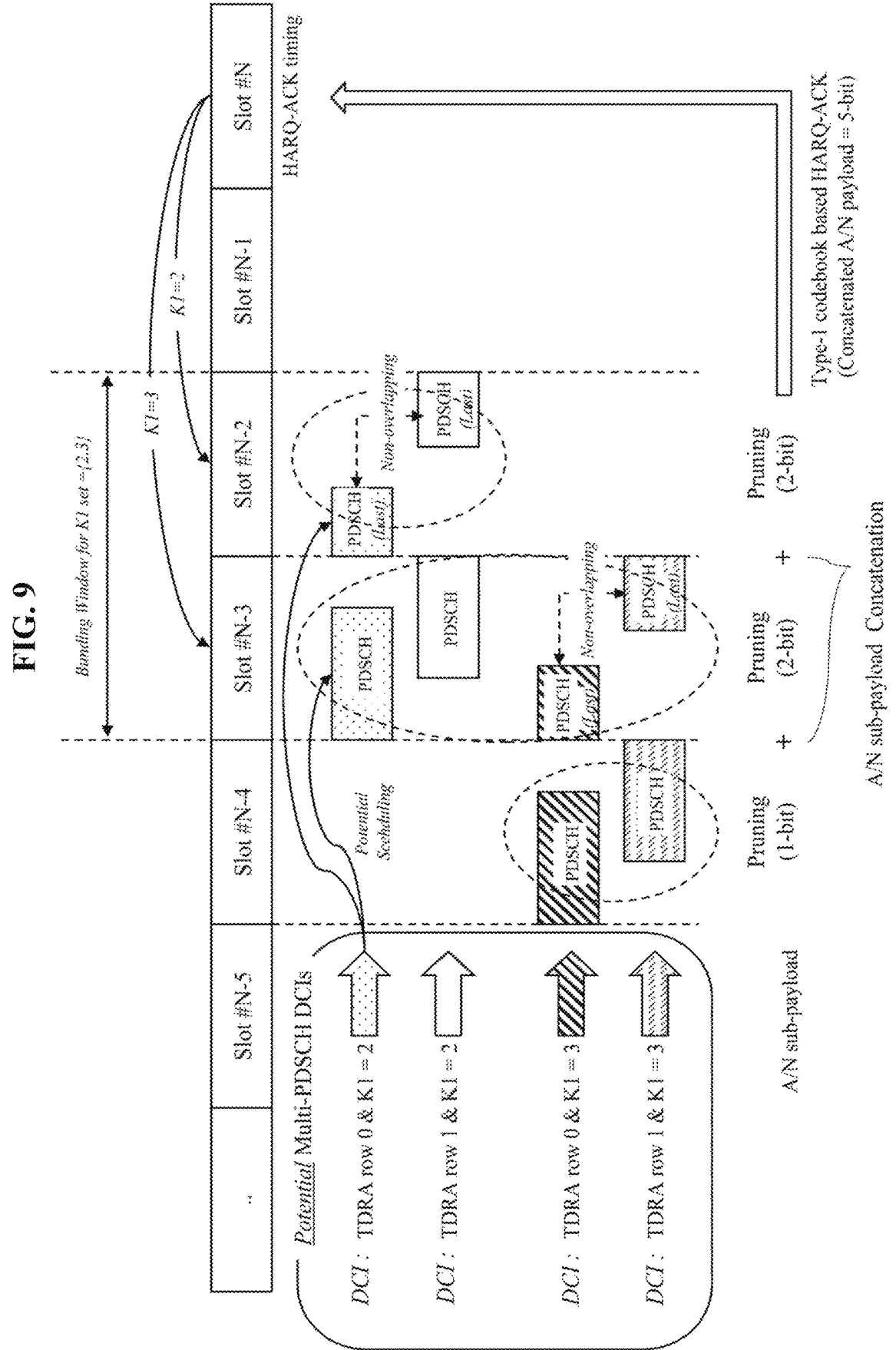
FIG. 9 illustrates start and length indicator value (SLIV) pruning for multi-TTI scheduling according to an embodiment of the present disclosure.

For convenience of description, a set of (N) DL slots corresponding to each K1 value may be referred to as a bundling window corresponding to the A/N transmission slot. For example, on the assumption that (candidate) K1 value set={2, 3} that may be indicated by DCI as illustrated in FIG. 9, the bundling window is a period from Slot #N-3 to Slot #-2.

E. It may occur that among a plurality of PDSCH transmission slots scheduled (or schedulable) by multi-TTI DCI which indicates (or may indicate) a specific slot as an A/N timing (corresponding the last (or first) PDSCH transmission slot), a specific slot does not belong to the bundling window corresponding to the A/N transmission slot.

For example, an A/N codebook determined according to the existing SLIV pruning method for the legacy single PDSCH scheduling may not cover at least part of multiple scheduled PDSCHs. In a more specific example, referring to FIG. 9, it is assumed that (i) two rows of a TDRA table are indictable by multi-PDSCH DCI, and (ii) each row includes two SLIVs (i.e., each row is related to scheduling of two PDSCHs), (iii) a K1 slot offset value being a PDSCH-to-HARQ-ACK timing is set to 2 (e.g., K1 value set={2, 3}). In a situation in which as PDSCH1 in slot #N-4 and PDSCH2 in slot #N-3 are scheduled by multi-PDSCH scheduling DCI (e.g., TDRA row 0), and K1=3 is indicated, an HARQ-ACK is transmitted in slot #N, the UE should report not only an A/N for Slot #N-3 (i.e., PDSCH2 corresponding to K1=3) belonging to the bundling Window, but also PDSCH1 (e.g., a PDSCH related to an extended K1 value) in slot #N-4 that does not belong to the bundling window. However, when the existing method (i.e., the SLIV pruning method for single PDSCH scheduling) is applied as it is, the UE drops A/N sub-payload for PDSCH1 in slot #N-4 because K1=4 is not included in the determined K1 value set. To solve the problem, an A/N codebook may be configured in the following manner according to an example of the present disclosure.

F. Opt 1: Basically, even for each of DL slots that do not belong to a bundling window (corresponding to a corresponding A/N transmission slot among DL slots schedulable by multi-TTI DCI that may indicate (a specific slot as) an A/N timing (corresponding to the last (or first) PDSCH transmission slot) (for every SLIV set schedulable in a corresponding DL slot by any multi-TTI DCI), the UE may configure A/N sub-payload by SLIV pruning. For example, the UE configures 1-bit A/N sub-payload even for slot #N−4 that does not belong to the bundling window by performing the SLIV pruning process in FIG. 9. Regarding multi-TTI scheduling, the UE may perform SLIV pruning even for a DL slot that does not belong to the bundling window as a result of considering a K0 value in each row=={{K0, mapping type, SLIV) for PDSCH1, {K0, mapping type, SLIV) for PDSCH2 . . . } in a TDRA table for the corresponding DL slot. In FIG. 9, slot #N−4 in which PDSCH1 is transmitted may be determined by K0 for PDSCH1 in the TDRA Table. As described above, in a state in which A/N sub-payload has been configured for each of DL slots that do not belong to the bundling window by performing the SLIV pruning process, the UE may operate as follows:

i. Opt a) An entire A/N codebook may be configured by mapping an A/N sub-payload set corresponding to the DL slots belonging to the bundling window, and then mapping the A/N sub-payload set corresponding to the DL slots that do not belong to the bundling window.

ii. Opt b) Alternatively, an entire A/N codebook may be configured by sequentially concatenating the A/N sub-payload of all DL slots belonging to the bundling window and all DL slots not belonging to the bundling window in time order of the DL slots.

iii. In this case, for each of the DL slots belonging to the bundling window, A/N sub-payload may be configured by performing SLIV pruning on all SLIV sets schedulable for the DL slot by any single-TTI DCI and/or multi-TTI DCI.

G. Opt 1A: In another method equivalent to Opt 1 (e.g., when slot #N is indicated as an A/N transmission timing), the following operation may be considered.

i. Step 1) As each row (including one or more SLIVs) in a TDRA table configured by multi-TTI DCI indicates each K1 configured for the UE (or configured in the multi-TTI DCI) (e.g., the last SLIV in the row is mapped to slot #(N−K1)), all K1_m values may be calculated on the assumption that each SLIV in the row is mapped to slot #(N−K1_m), and this process may be performed for all rows and all K1 values. Then, the union (defined as "K1_*m* Union" for convenience) of all K1_m values may be calculated.

1. Additionally, for specific single-TTI DCI (e.g., a DCI format which is not fallback DCI format 1_0 and does not configure multi-TTI scheduling), the UE may also include all K1 values configured for the UE (or in the DCI) in the K1_m Union (as K1_m values belonging to the K1_m Union).

ii. Step 2) A/N sub-payload may be configured by performing the SLIV pruning process for all SLIV sets mappable to slot #(N−K1_m) corresponding to each K1_m value belonging to the K1_m Union (from among the SLIVs in the rows in the TDRA table of the multi-TTI DCI and the rows in the TDRA table of the single-TTI DCI), and an entire A/N codebook may be configured by applying the method of Opt a or Opt b to each of the K1_m values or A/N sub-payload corresponding to each slot #(N−K1_m).

1. For example, for each SLIV group (including one or more (overlapped) SLIVs) determined through SLIV pruning for each of all K1_m values in the K1_m Union configured for each cell (this is defined as "HARQ-ACK PDSCH occasion (HPO)"), A/N sub-payload may be configured by allocating 2 bits (when the cell is configured with a PDSCH transmission of up to 2 TBs, and not with HARQ-ACK spatial bundling), 1 bit (when the cell is configured with a PDSCH transmission of up to 1 TB or with HARQ-ACK spatial bundling), or M bits (when the cell is configured with a PDSCH (or TB) transmission based on up to M CBGs).

2. In another example, when a "2-TB only for single PDSCH" operation is applied to the cell configured with a PDSCH transmission of up to 2 TBs (and not with spatial bundling) (and when there is a row including only one SLIV among the rows of the TDRA table configured in multi-TTI DCI (format) (this is called a "single-SLIV row")), or when there is specific single-TTI DCI configuring a PDSCH transmission of up to two TBs (e.g. when there is DCI (format) which is not fallback DCI format 1_0 and does not configure multi-TTI scheduling), 2 bits may be allocated to HPO(s) corresponding to a value matching K1 in the K1_m Union configured for the corresponding cell or slot #(N−K1) corresponding to this value (slot #(N−K1) belonging to the bundling window) (or HPO(s) corresponding to the single-SLIV row or rows in the TDRA table configured for a single TTI), whereas 1 bit may be allocated HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

3. In another example, when a "CBG only for single PDSCH" operation is applied to the cell configured with an up to M CBGs-based PDSCH transmission (and when there is a row including only one SLIV among the rows of the TDRA table configured in multi-TTI DCI (format) (this is called a "single-SLIV row")), or when there is specific single-TTI DCI configuring an up to M CBGs-based PDSCH transmission (e.g. when there is DCI (format) which is not fallback DCI format 1_0 and does not configure multi-TTI scheduling), M bits may be allocated to HPO(s) corresponding to a value matching K1 in the K1_m Union configured for the corresponding cell or slot #(N−K1) corresponding to this value (slot #(N−K1) belonging to the bundling window) (or HPO(s) corresponding to the single-SLIV row or rows in the TDRA table configured for a single TTI), whereas 1 bit may be allocated to HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

iii. When some of a plurality of SLIVs configured in one row of a TDRA table in multi-TTI DCI overlaps with a specific UL symbol (e.g., a UL symbol configured semi-statically by higher-layer signaling by tdd-UL-DL-ConfigurationCommon or tdd-UL-DL-ConfigurationDedicated) in determining a K1_m Union and performing the SLIV pruning process, the K1_m Union may be determined, and the SLIV pruning may be performed (based on the determined K1_m Union)

while excluding the corresponding SLIV. For example, the UE may consider a PDSCH corresponding to the SLIV overlapping with the UL symbol as an invalid PDSCH, and may perform the SLIV pruning process only on valid PDSCHs.

H. Opt 1B: To reduce UE complexity involved in the SLIV pruning process in Opt 1 or 1A, the following operation may be considered.

i. Step 1) A K1_m Union is calculated in the same process as Step 1 of Opt 1A, an SLIV set (defined as an "m-SLIV Union") is calculated on the assumption that all (of one or more) individual SLIVs configured in each row of a TDRA table configured in multi-TTI DCI are mapped to one (virtual) slot, and an SLIV set (defined as an "s-SLIV union") is calculated on the assumption that all SLIVs configured in each row of a TDRA table configured in single-TTI DCI are mapped to one (virtual) slot.

1. Alternatively, an SLIV set based on the assumption that all (plural) individual SLIVs set in each of all rows configured with SLIVs across multiple slots in a TDRA table configured in multi-TTI DCI are mapped to the same single (virtual) slot is determined as an "m-SLIV Union", and an SLIV set based on the assumption that all (of one or more) individual SLIVs set in each of all rows configured with SLIVs belonging to a single slot in a TDRA table configured in multi-TTI DCI and SLIVs configured in each of all rows in a TDRA table configured in single-TTI DCI are mapped to the same one (virtual) slot is determined as an "s-SLIV Union".

2. Alternatively, an SLIV set based on the assumption that all (plural) individual SLIVs set in each of all rows configured with a plurality of SLIVs in a TDRA table configured in multi-TTI DCI are mapped to the same single (virtual) slot is determined as an "m-SLIV Union", and an SLIV set based on the assumption that all individual SLIVs set in all rows each configured with a single SLIB in a TDRA table configured in multi-TTI DCI, and SLIVs set in each of all rows in a TDRA table configured in single-TTI DCI are mapped to the same one (virtual) slot is determined as an "s-SLIV Union".

ii. Step 2-Alt 1) A/N sub-payload may be configured by performing the SLIV pruning process for a union of all SLIVs belonging to the m-SLIV union and the s-SLIV union, for a value matching K1 in the K1_m Union or a corresponding slot #(N−K1) (belonging to a bundling window), and A/N sub-payload may be configured by performing the SLIV pruning process only for SLIVs belonging to the m-SLIV union, for a K1_m value not matching K1 or the corresponding slot #(N−K1_m) (not belonging to the bundling window). Then, an entire A/N codebook may be configured by applying the method of Opt a or Opt b to A/N sub-payload corresponding to each of the K1_m values or each slot #(N−K1_m).

1. For example, for each SLIV group (including one or more (overlapped) SLIVs) determined through SLIV pruning for each of all K1_m values in the K1_m union configured for each cell (this is defined as "HARQ-ACK PDSCH occasion (HPO)"), A/N sub-payload may be configured by allocating 2 bits (when the cell is configured with a PDSCH transmission of up to 2 TBs, and not with HARQ-ACK spatial bundling), 1 bit (when the cell is configured with a PDSCH transmission of up to 1 TB or with HARQ-ACK spatial bundling), or M bits (when the cell is configured with an up to M CBGs-based PDSCH (or TB) transmission).

2. In another example, when a "2-TB only for single PDSCH" operation is applied to the cell configured with a PDSCH transmission of up to 2 TBs (and not with spatial bundling) (and when there is a row including only one SLIV among the rows of the TDRA table configured in multi-TTI DCI (format) (this is called a "single-SLIV row")), or when there is specific single-TTI DCI configuring a PDSCH transmission of up to 2 TBs (e.g. when there is DCI (format) which is not fallback DCI format 1_0 and does not configure multi-TTI scheduling), 2 bits may be allocated to HPO(s) corresponding to HPO(s) corresponding to a value matching K1 in the K1_m Union configured for the corresponding cell or slot #(N−K1) corresponding to this value (slot #(N−K1) belonging to the bundling window) (or HPO(s) corresponding to the single-SLIV row or rows in the TDRA table configured for a single TTI), whereas 1 bit may be allocated HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

3. In another example, when a "CBG only for single PDSCH" operation is applied to the cell configured with an up to M CBGs-based PDSCH transmission (and when there is a row including only one SLIV among the rows of the TDRA table configured in multi-TTI DCI (format) (this is called a "single-SLIV row")), or when there is specific single-TTI DCI configuring an up to M CBGs-based PDSCH transmission (e.g. when there is DCI (format) which is not fallback DCI format 1_0 and does not configure multi-TTI scheduling), M bits may be allocated to HPO(s) corresponding to a value matching K1 in the K1_m Union configured for the corresponding cell or slot #(N−K1) corresponding to this value (slot #(N−K1) belonging to the bundling window) (or HPO(s) corresponding to the single-SLIV row or rows in the TDRA table configured for a single TTI), whereas 1 bit may be allocated to HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

iii. Step 2-Alt 2) A/N sub-payload may be configured by performing the SLIV pruning process for a union of all SLIVs belonging to the m-SLIV union and the s-SLIV union, for each of all K1_m values in a K1_m Union, and an entire A/N codebook may be configured by applying the method of Opt a or Opt b to A/N sub-payload corresponding to each K1_m value or each slot #(N−K1_*m*).

1. For example, for each SLIV group (including one or more (overlapped) SLIVs) determined through SLIV pruning for each of all K1_m values in a K1_m Union configured for each cell (this is defined as "HARQ-ACK PDSCH occasion (HPO)"), A/N sub-payload may be configured by allocating 2 bits (when the cell is configured with a PDSCH transmission of up to 2 TBs, and not with HARQ-ACK spatial bundling), 1 bit (when the cell is configured with a PDSCH transmission of up to 1 TB or with HARQ-ACK spatial bundling), or M bits (when the cell is configured with an up to M CBGs-based PDSCH (or TB) transmission).

2. In another example, when a "2-TB only for single PDSCH" operation is applied to the cell configured with a PDSCH transmission of up to 2 TBs (and not with spatial bundling) (and when there is a row including only one SLIV among the rows of a TDRA table configured in multi-TTI DCI (format) (this is called a "single-SLIV row")), or when there is specific single-TTI DCI configuring a PDSCH transmission of up to 2 TBs (e.g. when there is DCI (format) which is not fallback DCI format 1_0 and does not configure multi-TTI scheduling), 2 bits may be allocated to HPO(s) corresponding to a value matching K1 in a K1_m Union configured for the corresponding cell or slot #(N−K1) corresponding to this value (slot #(N−K1) belonging to the bundling window) (or HPO(s) corresponding to the single-SLIV row or rows in the TDRA table configured for a single TTI), whereas 1 bit may be allocated to HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

3. In another example, when a "CBG only for single PDSCH" operation is applied to a cell configured with an up to M CBGs-based PDSCH transmission (and when there is a row including only one SLIV among the rows of a TDRA table configured in multi-TTI DCI (format) (this is called a "single-SLIV row"), or when there is specific single-TTI DCI configuring an up to M CBGs-based PDSCH transmission (e.g. when there is DCI (format) which is not fallback DCI format 1_0 and does not configure multi-TTI scheduling), M bits may be allocated to HPO(s) corresponding to a value matching K1 in a K1_m Union configured for the corresponding cell or slot #(N−K1) corresponding to this value (slot #(N−K1) belonging to the bundling window) (or HPO(s) corresponding to the single-SLIV row or rows in a TDRA table configured for a single TTI), whereas 1 bit may be allocated to HPO(s) corresponding to a K1_m value that does not match K1 or slot #(N−K1_m) (not belonging to the bundling window) corresponding to this value (or the remaining HPO(s) corresponding to slot #(N−K1), including the HPO(s)).

iv. When some of a plurality of SLIVs configured in one row of a TDRA table in multi-TTI DCI overlaps with a specific UL symbol (e.g., a UL symbol configured semi-statically by higher-layer signaling such as tdd-UL-DL-ConfigurationCommon or tdd-UL-DL-ConfigurationDedicated) in determining a K1_m Union and an m_SLIV Union and performing the SLIV pruning process, the K1_m Union and the m-SLIV Union may be determined, and the SLIV pruning may be performed (based on the determined K1_m Union and m-SLIV Union) while excluding the corresponding SLIV.

I. Opt 2: Basically, in a state in which A/N sub-payload has been configured by performing the SLIV pruning process only for each of the DL slots belonging to the bundling window as described before, the following operations may be performed.

i. Opt a) When the maximum number of TBs (including a case in which spatial bundling is not configured) or the maximum number of PDSCHs (including a case in which spatial bundling is configured) schedulable by any multi-TTI DCI is set to M, a total A/N codebook may be configured by adding M bits (or M−X bits) to A/N sub-payload corresponding to each K1 value, and mapping A/Ns for a plurality of PDSCHs scheduled by multi-TTI DCI indicating the K1 value (as an A/N timing corresponding to the last (or first) PDSCH transmission slot) to corresponding M bits (or mapping A/Ns for the remaining PDSCHs except for the last (or first) PDSCH or PDSCH(s) transmitted in the same slot as the corresponding PDSCH to the corresponding M−X bits).

1. In the above example, "adding M bits (or M−X bits) to A/N sub-payload corresponding to each K1 value" may mean that Alt 1) an HPO set corresponding to the K1 value is configured (with a total of N+M or N+M−1 HPOs) by adding M or M−1 HPO(s) to N HPOs determined by performing the SLIV pruning process for the K1 value, or Alt 2) an HPO set corresponding to the K1 value is configured (with a total of N×(1+M) or N×(1+M−1)=N×M HPOs) by adding M or M−1 HPO(s) to each of N HPOs determined by performing the SLIV pruning process for the K1 value.

ⓐ Accordingly, A/N sub-payload corresponding to the K1 value may be configured for each HPO by allocating 2 bits (when the corresponding cell is configured with a PDSCH transmission of up to 2 TBs and not with HARQ-ACK spatial bundling), 1 bit (when the corresponding cell is configured with a PDSCH transmission of up to 1 TB and HARQ-ACK spatial bundling), or M bits (when the corresponding cell is configured with an up to M CBGs-based PDSCH transmission).

2. In this case, the SLIV pruning process may be performed only for the last SLIV (or one or more SLIVs belonging to the same slot as the last SLIV) among SLIVs set in each row of a TDRA table configured in multi-TTI DCI.

3. In the above example, the K1 value may be limited only to a K1 value set in the multi-TTI DCI (format), and for a K1 value not set in the multi-TTI DCI, (A/N sub-payload is configured for the K1 value based on SLIV pruning for the TDRA table as is done conventionally, and) the process of adding M bits (or M−X bits) as described above may be skipped.

4. In this case, on the assumption that a specific K1 value is indicated as an A/N timing (corresponding to the last PDSCH transmission slot), when all SLIVs set in each of all rows in a TDRA table configured in multi-TTI DCI (or all SLIVs except for the SLIVs (or the last of the SLIVs) of the last PDSCH transmission slot) overlap with a specific (e.g., semi-statically configured) UL symbol, the process of adding M bits (or M−X bits) may also be skipped for the K1 value.

ⓐ More specifically, in the case where SLIV pruning is performed on the last SLIV in each row of the TDRA table of the multi-TTI DCI (or one or more SLIVs belonging to the same slot as the last SLIV), for each K1 value in the example, when at least one SLIV in each row does not overlap with a specific (e.g., semi-statically configured) UL symbol, the SLIV pruning may be performed by including the row (the last SLIV(s) of the row) (in this case, characteristically, the row is included for SLIV pruning, even when the last SLIV(s) of the row overlaps with the specific (e.g., semi-statically configured) UL symbol). Otherwise, when all SLIVs in each row overlap with the specific (e.g., semi-statically configured) UL symbol, the SLIV pruning may be performed while excluding the corresponding row (the last SLIV(s) of the row).

ⓑ Accordingly, when all SLIVs (all of the remaining SLIVs except for the last SLIV(s)) in the row (to which one or more SLIVs in the same slot as the last SLIV belong) corresponding to an HPO determined by performing the SLIV pruning process overlap with a specific (e.g., semi-statically configured) UL symbol, the process of adding M or M−1 HPOs as described above may be skipped. Otherwise, when at least one SLIV (e.g. at least one remaining SLIV except for the last SLIV(s)) in the row does not overlap with the specific (e.g., semi-statically configured) UL symbol, the afore-described process of adding M or M−1 HPOs may be performed.

5. In the above example, when a transmission of up to 2 TBs is configured for each PDSCH, and HARQ-ACK spatial bundling is not configured, X=2, whereas when a transmission of up to 1 TB is configured for each PDSCH or HARQ-ACK spatial bundling is configured, X=1.

ii. Opt b) In a state in which for each K1 value, the (maximum) number of PDSCH occasions (SLIVs) which do/may not belong to the bundling window (or which do/may not belong to the last (or first) PDSCH transmission slot) (including a case in which spatial bundling is configured) among a plurality of PDSCHs schedulable by multi-TTI DCI indicating the K1 value or the (maximum) number (e.g., L) of TBs corresponding to the (maximum) number of PDSCH occasions (SLIVs) (including a case in which spatial bundling is not configured) is calculated, and L bits are added to A/N sub-payload corresponding to the K1 value, a total A/N codebook may be configured by mapping A/Ns for PDSCHs not belonging to the bundling window (or to the last (or first) PDSCH transmission slot) among PDSCHs scheduled by multi-TTI DCI indicating the K1 value (as an A/N timing corresponding to the last (or first) PDSCH transmission slot) to the L bits.

1. In the above example, "adding L bits to A/N sub-payload corresponding to the K1 value" may mean that Alt 1) an HPO set corresponding to the K1 value is configured (with a total of N+L HPOs) by adding L HPO(s) to N HPO(s) determined by performing the SLIV pruning process for the K1 value, or Alt 2) an HPO set corresponding to the K1 value is configured (with a total of N× (1+L) HPOs) by adding L HPO(s) to each of N HPO(s) determined by performing the SLIV pruning process for the K1 value.

ⓐ Accordingly, A/N sub-payload corresponding to the K1 value may be configured for each HPO by allocating 2 bits (when the corresponding cell is configured with a PDSCH transmission of up to 2 TBs and not with HARQ-ACK spatial bundling), 1 bit (when the corresponding cell is configured with a PDSCH transmission of up to 1 TB and HARQ-ACK spatial bundling), or M bits (when the corresponding cell is configured with an up to M CBGs-based PDSCH (or TB) transmission).

2. In this case, the SLIV pruning process may be performed only for the last SLIV (or one or more SLIVs belonging to the same slot as the last SLIV) among SLIVs set in each row of a TDRA table configured in multi-TTI DCI.

3. In the above example, the K1 value may be limited only to a K1 value set in the multi-TTI DCI (format), and for a K1 value not set in the multi-TTI DCI, (A/N payload corresponding to the K1 value is configured based on SLIV pruning for the TDRA table as is done conventionally, and) the above-described process of adding L bits may be skipped.

4. In this case, on the assumption that a specific K1 value is indicated as an A/N timing (corresponding to the last PDSCH transmission slot), when all SLIVs set in each of all rows in the TDRA table configured in the multi-TTI DCI (or all SLIVs except for the SLIVs (or the last of the SLIVs) of the last PDSCH transmission slot) overlap with a specific (e.g., semi-statically configured) UL symbol, the process of adding L bits may also be skipped for the K1 value.

ⓐ More specifically, in the case where SLIV pruning is performed on the last SLIV in each row of the TDRA table of the multi-TTI DCI (or one or more SLIVs belonging to the same slot as the last SLIV), for each K1 value in the example, when at least one SLIV in each row does not overlap with a specific (e.g., semi-statically configured) UL symbol, the SLIV pruning may be performed by including the row (the last SLIV(s) of the row) (in this case, characteristically, the row is included for SLIV pruning, even when the last SLIV(s) of the row overlaps with the specific (e.g., semi-statically configured) UL symbol). Otherwise, when all SLIVs in each row overlap with the specific (e.g., semi-statically configured) UL symbol, the SLIV pruning may be performed while excluding the corresponding row (the last SLIV(s) of the row).

ⓑ Accordingly, when all SLIVs (all of the remaining SLIVs except for the last SLIV(s)) in the row (to which one or more SLIVs in the same slot as the last SLIV belong) corresponding to an HPO determined by performing the SLIV pruning process overlap with a specific (e.g., semi-statically configured) UL symbol, the process of adding L HPOs as described above may be skipped. Otherwise, when at least one SLIV (e.g. at least one remaining SLIV except for the last SLIV(s)) in the row does not overlap with the specific (e.g., semi-statically configured) UL symbol, the afore-described process of adding L HPOs may be performed.

iii. Opt c) For each K1 value, A/N sub-payload may be configured by performing SLIV pruning on a set of all SLIVs mappable to each slot (or irrespective of mappable to the slot) included in a set of a plurality of slots (for convenience, referred to as a "multi-TTI window") schedulable by multi-TTI DCI indicating the K1 value (among SLIVs configured in the rows of the TDRA table of the multi-TTI DCI and the rows of the TDRA table of single-TTI DCI), and the A/N sub-payload configuration per K1 based on SLIV pruning for the multi-TTI window (each slot belonging to the multi-TTI window) may be performed sequentially for all K1 values.

In the above example, the K1 value (for which SLIV pruning is performed in the multi-TTI window) may be limited only to a K1 value set in the multi-TTI DCI (format), and for a K1 value not set in the multi-TTI DCI, A/N payload corresponding to the K1 value may be configured based on SLIV pruning for a TDRA table (for rows each configured with a single SLIV) configured in single-TTI DCI as is done conventionally.

2. When some of a plurality of SLIVs configured in one row of the TDRA table of the multi-TTI DCI overlaps with a specific (e.g., semi-statically configured) UL symbol during SLIV pruning for the multi-TTI window on a K1 basis, a multi-TTI window (including slots including at least one (valid) SLIV) may be determined while excluding the SLIVs (as invalid), and SLIV pruning may be performed for the multi-TTI window.

J. In the case of A/N sub-payload configured by performing the SLIV pruning process for a specific K1 value (a DL slot corresponding to the K1 value) in all methods (e.g. Opt 1/1A/1B/2), a UE which does not have a capability of receiving a plurality of TDMed PDSCHs in one slot period or for which the capability is not supported may configure A/N sub-payload only with A/N bits corresponding to one PDSCH occasion. (For example, 2 A/N bits may be configured when a PDSCH transmission of up to 2 TBs is configured, and HARQ-ACK spatial bundling is not configured, whereas 1 A/N bit may be configured when a PDSCH transmission of up to 1 TB and HARQ-ACK spatial bundling are configured).

K. Additionally, the operation of performing the SLIV pruning process for a specific K1 value and configuring A/N sub-payload (and adding M or M−X bits, or L bits to the A/N sub-payload) in all the above-described methods (e.g. Opt 1/1A/1B/2) may amount to an operation of performing the SLIV pruning process and configuring A/N sub-payload (and adding M or M−X bits, or L bits to the A/N sub-payload) on a DL slot basis, for a plurality of DL slots included in/belonging to a UL slot period earlier than an HARQ-ACK transmission UL slot by K1 slots in a situation in which an SCS configured for UL (HARQ-ACK) is smaller than an SCS configured for DL (PDSCH).

(Proposal 9) Operation of Receiving Plural PDSCHs Scheduled by Multi-TTI DCI

1) TCI Information and QCL Assumption Applied for PDSCH Reception by UE

A. Conventionally, i. When a time offset between DCI and a PDSCH (scheduled by the DCI) is equal to or greater than a specific threshold (e.g. timeDurationForQCL), the PDSCH may be received by applying a TCI state indicated by the DCI and an associated QCL assumption.

ii. Otherwise, when the DCI-to-PDSCH time offset is less than the specific threshold, the PDSCH may be received by applying a TCI state configured for (reception of) a specific CORESET (e.g., a CORESET having a lowest ID) and an associated QCL assumption.

B. Regarding a plurality of PDSCHs scheduled by multi-TTI DCI, the following operations may be performed:

i. Opt 1: A PDSCH (i.e., PDSCH-D) for which a DCI-to-PDSCH time offset is equal to or greater than a specific threshold may be received by applying a TCI state indicated by the DCI and an associated QCL assumption, whereas a PDSCH (i.e., PDSCH-C) for which a DCI-to-PDSCH time offset is less than the specific threshold may be received by applying a TCI state configured for (reception of) a specific CORESET (e.g., a CORESET having a lowest ID) at a specific time (e.g., in the latest CORESET configuration slot including and/or before the first PDSCH transmission slot among a plurality of PDSCHs) and an associated QCL assumption commonly to corresponding PDSCH (s).

1. Specific DCI/MAC signaling (i.e., a TCI update command) may instruct a set of a candidate TCI state (which may be indicated by PDSCH scheduling DCI including multi-TTI DCI) and an associated QCL assumption to be changed to other values, and accordingly, the UE may apply the changed update TCI state and associated QCL assumption set from a time point (i.e., TCI update timing) after a specific time from a reception time of the TCI update command or a corresponding ACK feedback time.

In the above situation, when the TCI update timing is located after the reception time of at least one of PDSCH-Ds, a non-updated TCI state and associated QCL assumption set prior to the change may be applied to all PDSCH-Ds. When the TCI update timing is located before the reception times of all PDSCH-Ds, the updated TCI state and associated QCL assumption set after the change may be applied to all PDSCH-Ds.

In another example, when the TCI update timing is located after the reception time of a specific one (some or all) of the PDSCH-Ds, the same TCI state and associated QCL assumption as those of a PDSCH-C may be applied to the specific PDSCH-D (by treating the specific PDSCH-D in the same manner for the PDSCH-C for which the DCI-to-PDSCH time offset is less than the specific threshold), whereas the updated TCI state and associated QCL assumption set after the change may be applied to the remaining PDSCH-Ds (for which the TCI update timing is located before the reception times of all PDSCH-Ds). When the TCI update timing is located before the reception times of all PDSCH-Ds, the updated TCI state and associated QCL assumption set after the change may be applied to all PDSCH-Ds.

And/or, reception of a PDSCH located before the TCI update timing among the plurality of PDSCHs scheduled by the multi-TTI DCI may be dropped, and the PDSCH may be considered equally as the following invalid PDSCH. Alternatively, reception of a PDSCH located before the TCI update timing among the plurality of PDSCH-Ds (scheduled by the multi-TTI DCI) may be dropped, and the PDSCH may be considered equally as the following invalid PDSCH.

2. In the above example, the first PDSCH may refer to the first of actually transmitted valid PDSCHs except for invalid PDSCHs which overlap in time with a specific (e.g., semi-statically configured by higher-layer signaling such as tdd-UL-DL-ConfigurationCommon or tdd-UL-DL-ConfigurationDedicated) UL symbol and thus the transmissions of which are dropped, or the first of PDSCHs indicated by the multi-TTI DCI regardless of whether they are actually transmitted.

ii. Opt 2: When the DCI-to-PDSCH time offsets of all PDSCHs are equal to or greater than a specific threshold, all of the PDSCHs (i.e., PDSCH-Ds) may be received by applying a TCI state indicated by the DCI and an associated QCL assumption. When the DCI-to-PDSCH time offset of at least one PDSCH is less than the specific threshold, all scheduled PDSCHs (i.e., PDSCH-Cs) may be received by applying a TCI state configured for (reception of) a specific CORESET (e.g., a CORESET having a lowest ID) at a specific time (e.g., in the latest CORESET configuration slot including and/or before a transmission slot of the first of the plurality of PDSCHs) and an associated QCL assumption commonly to all of the PDSCHs.

1. In the above situation in which a TCI update command has been transmitted/received, when a corresponding TCI update timing is located before the reception time of at least one of PDSCH-Ds, a non-updated TCI state and associated QCL assumption set prior to the change may be applied to all PDSCH-Ds. When the TCI update timing is located before the reception times of all PDSCH-Ds, the updated TCI state and associated QCL assumption set after the change may be applied to all PDSCH-Ds.

In another example, when the TCI update timing is located after the reception time of a specific one (some or all) of the PDSCH-Ds, the same TCI state and associated QCL assumption as those of a PDSCH-C may be applied to the specific PDSCH-D (by treating the specific PDSCH-D in the same manner as the PDSCH-C for which the DCI-to-PDSCH time offset is less than the specific threshold), whereas the updated TCI state and associated QCL assumption set after the change may be applied to the remaining PDSCH-Ds (for which the TCI update timing is located before the reception times of all PDSCH-Ds). When the TCI update timing is located before the reception times of all PDSCH-Ds, the updated TCI state and associated QCL assumption set after the change may be applied to all PDSCH-Ds.

Further in the above situation, a TCI state configured for (reception of) a specific CORESET (e.g., a CORESET having a lowest ID) at a specific time (e.g., in the latest CORESET configuration slot including and/or before the first PDSCH transmission slot) and an associated QCL assumption may be commonly applied to all PDSCH-Cs, regardless of whether the TCI update timing is located after the reception time of at least one of the PDSCH-Cs or before the reception times of all of the PDSCH-Cs.

And/or, reception of a PDSCH located before the TCI update timing among the plurality of PDSCHs scheduled by the multi-TTI DCI may be dropped, and the PDSCH may be considered equally as the following invalid PDSCH. Alternatively, reception of a PDSCH located before the TCI update timing among a plurality of PDSCH-Ds (scheduled by the multi-TTI DCI) may be dropped, and the PDSCH may be considered equally as the following invalid PDSCH.

2. In the above example, all PDSCHs, at least one PDSCH, and the first PDSCH may refer to all, at least one, and the first of actually transmitted valid PDSCHs except for invalid PDSCHs which overlap in time with a specific (e.g., semi-statically configured by higher-layer signaling such as tdd-UL-DL-ConfigurationCommon or tdd-UL-DL-ConfigurationDedicated) UL symbol and thus the transmissions of which are dropped, or all, at least one, and the first of PDSCHs indicated by the multi-TTI DCI regardless of whether they are actually transmitted.

iii. Opt 3: A PDSCH (i.e., PDSCH-D) for which a DCI-to-PDSCH time offset is equal to or greater than a specific threshold may be received by applying a TCI state indicated by the DCI and an associated QCL assumption, whereas a PDSCH (i.e., PDSCH-C) for which a DCI-to-PDSCH time offset is less than the specific threshold may be received by applying a TCI state configured for (reception of) a specific CORESET (e.g., a CORESET having a lowest ID) at a specific time (e.g., in the latest CORESET configuration slot including and/or before the first PDSCH transmission slot among a plurality of PDSCHs) and an associated QCL assumption commonly to corresponding PDSCH (s).

1. In the above situation in which a TCI update command has been transmitted/received, when a TCI update timing is located before the reception time of at least one of PDSCH-Ds, a non-updated TCI state and associated QCL assumption set prior to the change may be applied to all PDSCH-Ds. When the TCI update timing is located before the reception times of all PDSCH-Ds, the updated TCI state and associated QCL assumption set after the change may be applied to all PDSCH-Ds.

In another example, when the TCI update timing is located after the reception time of a specific one (some or all) of the PDSCH-Ds, the same TCI state and associated QCL assumption as those of a PDSCH-C may be applied to the specific PDSCH-D (by treating the specific PDSCH-D in the same manner as the PDSCH-C for which the DCI-to-PDSCH time offset is less than the specific threshold), whereas the updated TCI state and associated QCL assumption set after the change may be applied to the remaining PDSCH-Ds (for which the TCI update timing is located before the reception times of all PDSCH-Ds). When the TCI update timing is located before the reception times of all PDSCH-Ds, the updated TCI state and associated QCL assumption set after the change may be applied to all PDSCH-Ds.

And/or, reception of a PDSCH located before the TCI update timing among the plurality of PDSCHs scheduled by the multi-TTI DCI may be dropped, and the PDSCH may be considered equally as the following invalid PDSCH. Alternatively, reception of a PDSCH located before the TCI update timing among a plurality of PDSCH-Ds (scheduled by the multi-TTI DCI) may be dropped, and the PDSCH may be considered equally as the following invalid PDSCH.

iv. Opt 4: A different TCI state and associated QCL assumption for PDSCH reception may be applied according to an interval between PDSCHs and/or an SCS configured for a PDSCH. Specifically, for a PDSCH having a DCI-to-PDSCH time offset less than a specific threshold, or for all scheduled PDSCHs including at least one PDSCH having a DCI-to-PDSCH time offset less than the specific threshold, the following operations may be performed.

1. For example, when PDSCHs are scheduled in consecutive symbols or consecutive slots (or with a gap less than X symbols or Y slots between adjacent PDSCHs), the method of Opt 1 or Opt 2 may be applied. When PDSCHs are scheduled in non-consecutive symbols or non-consecutive slots (or with a gap equal to or greater than X symbols or Y slots between adjacent PDSCHs), the method of Opt 3 (or Opt 1) may be applied.

2. In another example, when a relatively large SCS (e.g., 480 KHz and 960 KHz, or 960 KH2) is configured for PDSCHs, the method of Opt 1 or Opt 2 may be applied. When a relatively small SCS (e.g., 120 KHz, or 120 KHz and 480 KHz) is configured for the PDSCHs, the method of Opt 3 (or Opt 1) may be applied.

3. In the above example, at least one PDSCH and a specific PDSCH may refer to at least one and a specific one of actually transmitted valid PDSCHs except for invalid PDSCHs which overlap in time with a specific (e.g., semi-statically configured) UL symbol and the transmissions of which are dropped, or at least one and a specific one of PDSCHs indicated by multi-TTI DCI regardless of whether the PDSCHs are actually transmitted.

C. When a PDCCH and a PDSCH overlap with each other in time, the following operation may be performed conventionally.

i. When the QCL (type D) assumption is different between the PDCCH and the PDSCH, the PDCCH may be received (while reception of the PDSCH may be dropped).

D. Among a plurality of PDSCHs scheduled by multi-TTI DCI, i. Opt A: When a PDSCH and a specific PDCCH between which a DCI-to-PDSCH time offset is less than a specific threshold overlap with each other in time, and the QCL (type D) assumption is different between the PDSCH and the PDCCH, the PDCCH may be received (while reception of the PDSCH may be dropped). When a PDSCH and a specific PDCCH between which the DCI-to-PDSCH time offset is equal to or greater than the specific threshold overlap with each other in time, and the QCL (type D) assumption is different between the PDSCH and the PDCCH, the PDSCH may be received (while reception of the PDCCH may be dropped).

Alternatively, when a PDSCH for which application of a TCI state configured for a specific CORESET and an associated QCL assumption is determined by Opt 1/2/3/4 (or any other method) and a specific PDCCH overlap with each other in time, and the QCL (type D) assumption is different between the PDSCH and the PDCCH, the PDCCH may be received (while reception of the PDSCH may be dropped). When a PDSCH for which application of a TCI state indicated by DCI and an associated QCL assumption is determined and a specific PDCCH overlap with each other in time, and the QCL (type D) assumption is different between the PDSCH and the PDCCH, the PDSCH may be received (while reception of the PDCCH may be dropped).

ii. Opt B: In the case where it is determined to apply a TCI state configured for a specific CORESET and an associated QCL assumption to all scheduled PDSCHs (when received) by Opt 1/2/3/4 (or any other method), when the QCL (type D) assumption is different between a corresponding PDSCH and a PDCCH (overlapping with the PDSCH in time), the PDSCH may be received (while reception of the PDCCH may be dropped). And/or, in the case where it is determined to apply a TCI state configured for a specific CORESET and an associated QCL assumption to specific some (or all) scheduled PDSCHs (when received) by Opt 1/2/3/4 (or any other method), when the QCL (type D) assumption is different between a corresponding PDSCH and a PDCCH (overlapping with the PDSCH in time), the PDCCH may be received (while reception of the PDSCH may be dropped).

Alternatively, in the case where it is determined to apply a TCI state configured for a specific CORESET and an associated QCL assumption to all scheduled PDSCHs (when received) by Opt 1/2/3/4 (or any other method), when the QCL (type D) assumption is different between a corresponding PDSCH and a PDCCH (overlapping with the PDSCH in time), the PDCCH may be received (while reception of the PDSCH may be dropped). Otherwise (i.e., in the case where it is determined to apply a TCI state indicated by DCI and an associated QCL assumption to at least one PDSCH (when received), when the QCL (type D) assumption is different between a corresponding PDSCH and a PDCCH (overlapping with the PDSCH in time) (for all scheduled PDSCHs), the PDSCH may be received (while reception of the PDCCH may be dropped).

Alternatively, in the case where it is determined to apply a TCI state indicated by DCI and an associated QCL assumption to all scheduled PDSCHs (when received) by Opt 1/2/3/4 (or any other method), when the QCL (type D) assumption is different between a corresponding PDSCH and a PDCCH (overlapping with the PDSCH in time), the PDSCH may be received (while reception of the PDCCH may be dropped). Otherwise (i.e., in the case where it is determined to apply a TCI state configured for a specific CORESET and an associated QCL assumption to at least one PDSCH (when received), when the QCL (type D) assumption is different between a corresponding PDSCH and a PDCCH (overlapping with the PDSCH in time) (for all scheduled PDSCHs), the PDCCH may be received (while reception of the PDSCH may be dropped).

iii. Opt C: In the case where it is determined to apply a TCI state configured for a specific CORESET and an associated QCL assumption to specific some (or all of) scheduled PDSCHs (when received) by Opt 1/2/3/4 (or any other method), when the QCL (type D) assumption is different between a corresponding PDSCH and a PDCCH (overlapping with the PDSCH in time), the PDSCH may be received (while reception of the PDCCH may be dropped). And/or in the case where it is determined to apply a TCI state indicated by DCI and an associated QCL assumption to all scheduled PDSCHs (when received) by Opt 1/2/3/4 (or any other method), when the QCL (type D) assumption is different between a corresponding PDSCH and a PDCCH (overlapping with the PDSCH in time), the PDCCH may be received (while reception of the PDSCH may be dropped).

Alternatively, in the case where it is determined to apply a TCI state configured for a specific CORESET and an associated QCL assumption to at least one PDSCH (when received) by Opt 1/2/3/4 (or any other method), when the QCL (type D) assumption is different between a corresponding PDSCH and a PDCCH (overlapping with the PDSCH in time) (for all scheduled PDSCHs), the PDCCH may be received (while reception of the PDSCH may be dropped). Otherwise (in the case where it is determined to apply a TCI state indicated by DCI and an associated QCL assumption to all scheduled PDSCHs (when received)), when the QCL (type D) assumption is different between a corresponding PDSCH and a PDCCH (overlapping with the PDSCH in time), the PDSCH may be received (while reception of the PDCCH may be dropped).

Alternatively, in the case where it is determined to apply a TCI state indicated by DCI and an associated QCL assumption to at least one PDSCH (when received) by Opt 1/2/3/4 (or any other method), when the QCL (type D) assumption is different between a corresponding PDSCH and a PDCCH (overlapping with the PDSCH in time) (for all scheduled PDSCHs), the PDSCH may be received (while reception of the PDCCH may be dropped). Otherwise (in the case where it is determined to apply a TCI state configured for a specific CORESET and an associated QCL assumption to all scheduled PDSCHs (when received)), when the QCL (type D) assumption is different between a corresponding PDSCH and a PDCCH (overlapping with the PDSCH in time), the PDCCH may be received (while reception of the PDSCH may be dropped).

iv. Opt D: In the case where a plurality of PDSCHs are scheduled by multi-TTI DCI, when the QCL (type D) assumption is different between a corresponding PDSCH and a PDCCH (overlapping with the PDSCH in time), the PDSCH may be received (while reception of the PDCCH may be dropped).

Alternatively, in the case where a plurality of PDSCHs are scheduled by multi-TTI DCI, when the QCL (type D) assumption is different between a corresponding PDSCH and a PDCCH (overlapping with the PDSCH in time), the PDCCH may be received (while reception of the PDSCH may be dropped).

1. In the above example, a plurality of PDSCHs refer to a plurality of actually transmitted valid PDSCHs except for invalid PDSCHs which overlap in time with a specific (e.g., semi-statically configured) UL symbol and the transmissions of which are skipped, or a plurality of PDSCHs indicated by multi-TTI DCI regardless of whether they are actually transmitted.

E. A CORESET and a CORESET configuration slot used to determine a TCI state and an associated QCL assumption which are applied to reception of a specific PDSCH (e.g., the first or each of a plurality of PDSCHs scheduled by multi-TTI DCI) (e.g., PDSCH-x) may be replaced with a CORESET configured with the same CORSET pool index (e.g., coresetPoolIndex) as a CORESET carrying a PDCCH that schedules the specific PDSCH-X, and a slot in which the CORESET is configured, in a situation in which a PDSCH transmission based on a plurality of TRPs is configured.

F. Alternatively, in the case of a specific PDSCH (e.g., PDSCH-x) received by applying a TCI state configured for a specific CORSET and an associated QCL assumption in the above example, the PDSCH-x may be received by applying a TCI state configured for a specific TCI codepoint (e.g., having a lowest index) and an associated QCL assumption, among TCI codepoints (in a pair) configured with two (different) TCI states among TCI codepoints (configured for PDSCH reception) that may be indicated by DCI in a situation in which a PDSCH transmission based on a plurality of TRPs is configured.

G. Alternatively, in the case of a specific PDSCH (e.g., PDSCH-x) received by applying a TCI state configured for a specific CORSET and an associated QCL assumption in the above example, the PDSCH-x may be received by applying a TCI state configured for a specific TCI codepoint (e.g., having a lowest index) and an associated QCL assumption, among TCI codepoints (in a pair) configured with two (different) TCI states among (activated) TCI code points (configured for PDSCH reception) that may be indicated by DCI, in a situation in which a PDSCH transmission in a specific cell is scheduled by DCI in another cell (cross-CC scheduling).

Distinction is made between the above-described various DCI field configuration methods/options, for convenience of description. A plurality of configuration methods/options may be combined, and each may be implemented as an individual invention.

Figure 10:
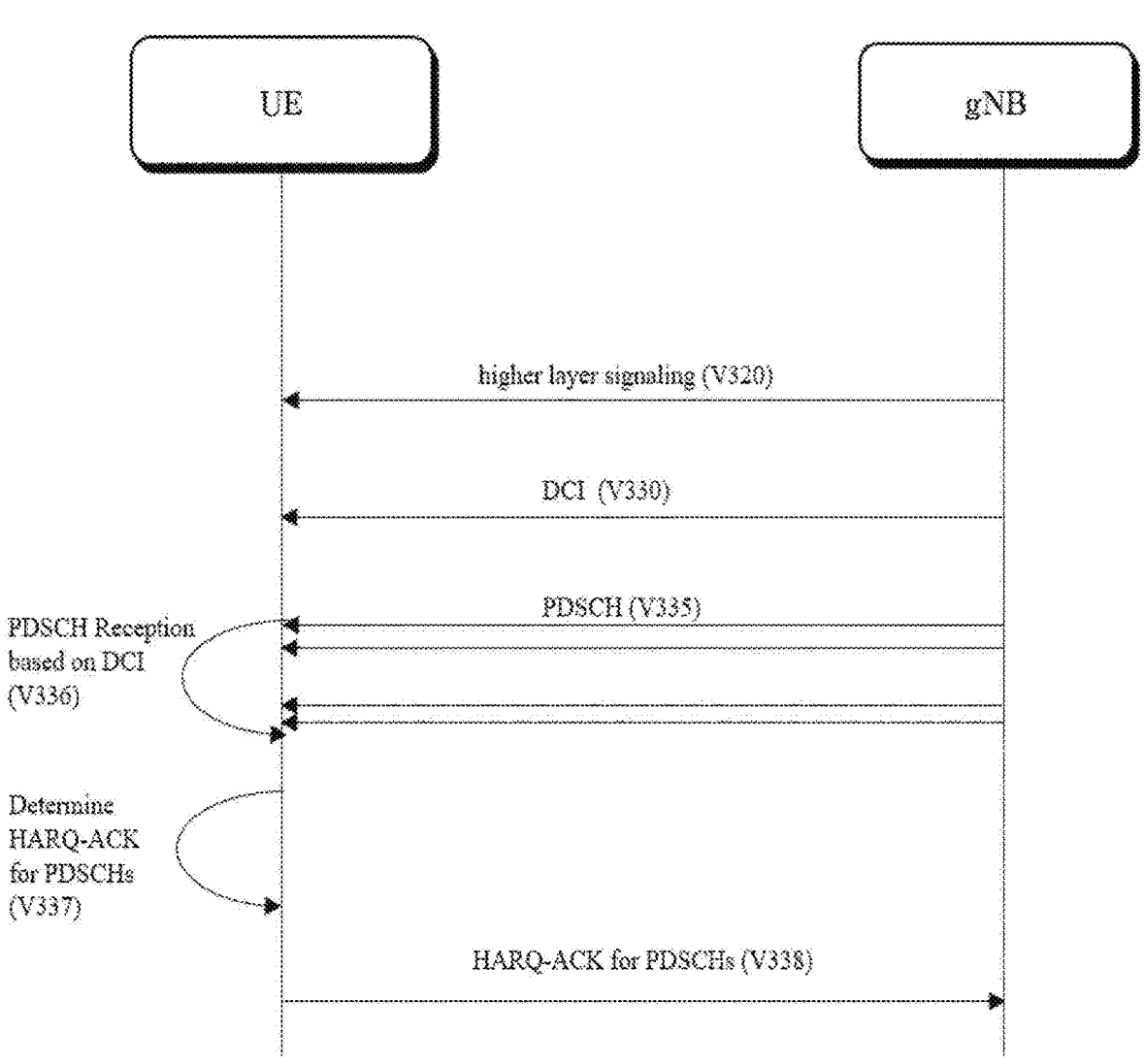
FIG. 10 illustrates multi-physical downlink shared channel (PDSCH) scheduling and HARQ-ACK reporting according to an embodiment of the present disclosure.

FIG. 10 illustrates multi-PDSCH scheduling and HARQ-ACK reporting according to an embodiment of the present disclosure. FIG. 10 is exemplary, not limiting the present disclosure.

A UE may receive information from a BS by higher-layer signaling (V320). For example, configuration information related to multi-PDSCH scheduling and configuration information related to multi-PDSCH HARQ-ACK feedback may be received by higher-layer signaling. For example, higher-layer parameters (or table) related to a value to be indicated by a state of at least one of the afore-descried DCI fields may be configured.

The UE may receive DCI (one PDCCH signal) (V330). The UE may perform blind detection for DCI that schedules multiple PDSCHs based on the information received by the higher-layer signaling.

The BS may transmit multiple PDSCHs scheduled by one DCI transmission (V335). The UE may receive the multiple PDSCHs based on the DCI. For example, the multiple PDSCHs may be received based on the state of at least one field of the DCI.

The UE may generate/determine an HARQ-ACK for (all or at least part of) the received PDSCHs (V337). The HARQ-ACK may be generated based on a specific codebook. The UE may refer to the higher-layer signaled information and/or the DCI to generate/determine the HARQ-ACK. For example, the HARQ-ACK may be generated based on a Type-1 codebook, a Type-2 codebook, or a Type-3 codebook.

The UE may transmit the HARQ-ACK for the PDSCHs (V338). HARQ-ACK transmission resources (time resources and a timing) may be determined based on the DCI and a (last) PDSCH.

Figure 11:
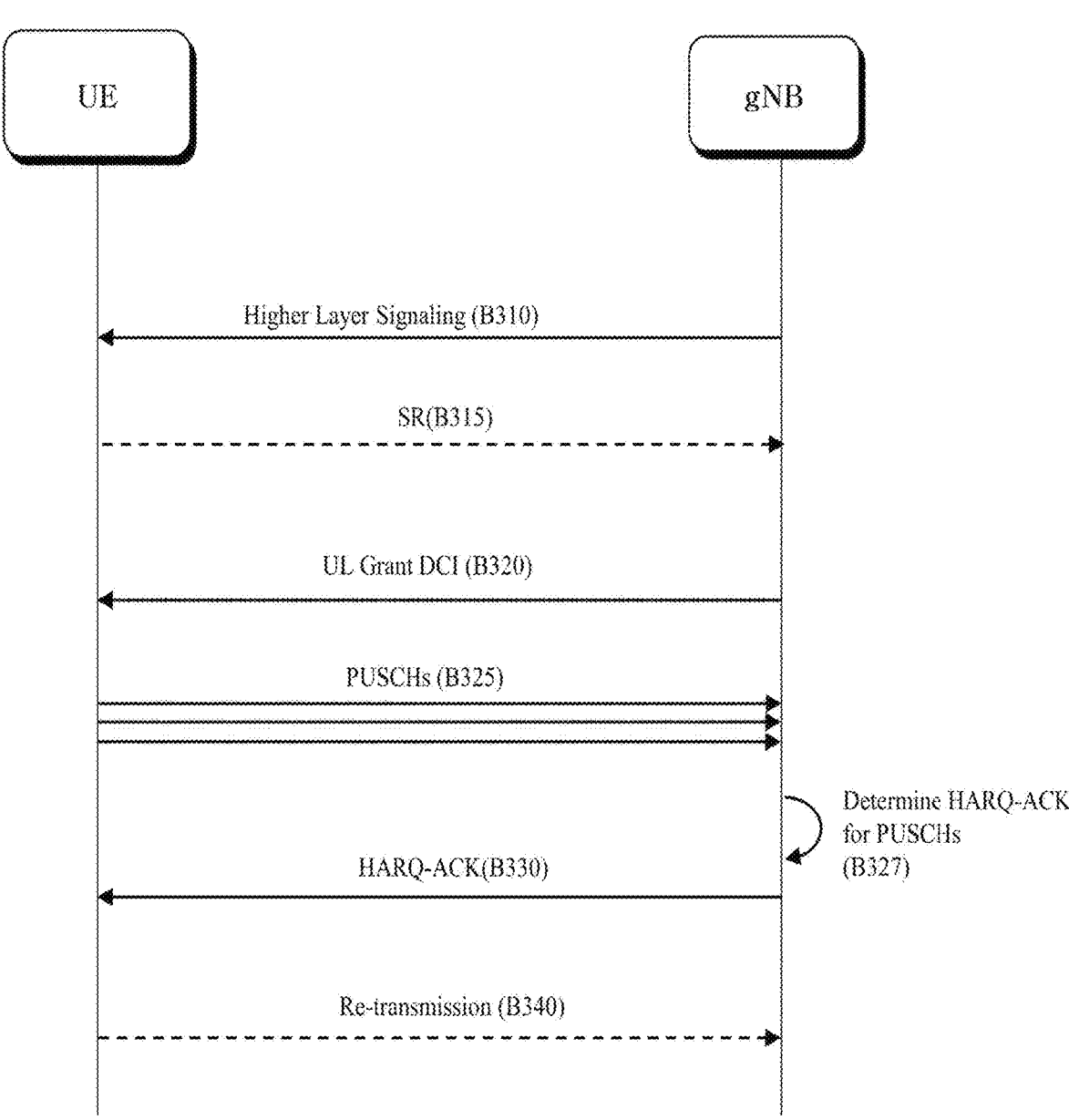
FIG. 11 illustrates multi-TTI PUSCH transmission/reception and HARQ-ACK reception according to an embodiment of the present disclosure.

FIG. 11 illustrates multi-PDSCH transmission/reception and HARQ-ACK reception according to an embodiment of the present disclosure. FIG. 11 is exemplary, not limiting the present disclosure.

A UE may receive information from a BS by higher-layer signaling (B310). For example, configuration information related to multi-PUSCH scheduling and configuration information related to multi-PUSCH HARQ-ACK feedback may be received by higher-layer signaling. For example, high-layer parameters (or table) related to a value to be indicated by a state of at least one of the afore-descried DCI fields may be configured.

The UE may transmit a scheduling request (SR) (B315). The SR may be a resource allocation request for multi-PUSCH transmission.

The UE may receive DCI (one PDCCH signal) (B320). The UE may perform blind detection for DCI that schedules multiple PUSCHs based on the information received by the higher-layer signaling.

The UE may transmit multiple PUSCHs based on one DCI reception (B325). The BS may receive the multiple PUSCHs based on the DCI. For example, the multiple PUSCHs may be transmitted/received based on the state of at least one field of the DCI.

The BS may generate/determine an HARQ-ACK for (all or at least part of) the received PUSCHs (B327).

The BS may transmit the HARQ-ACK for the PUSCHs (B330).

The UE may perform a retransmission based on the HARQ-ACK (B340).

Figure 12:
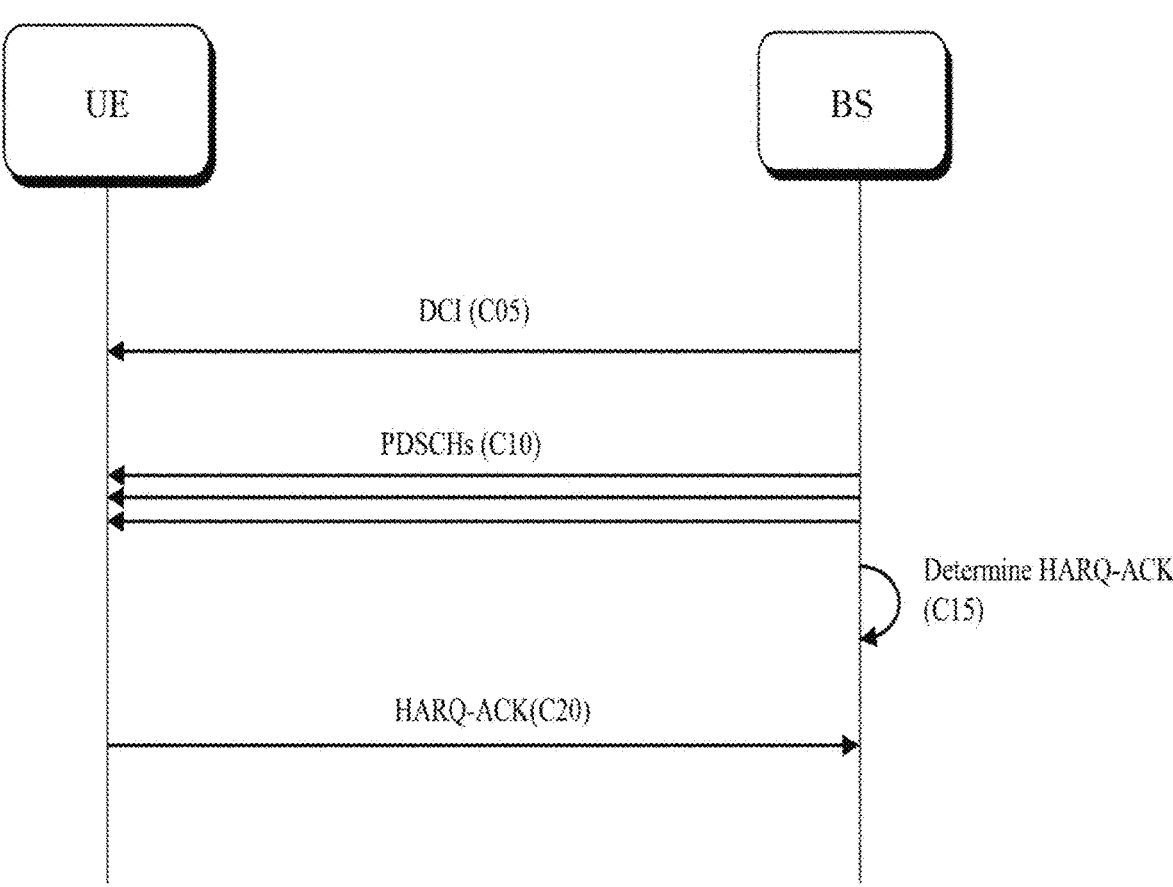
FIGS. 12 and 13 illustrate signal transmission and reception methods, respectively according to an embodiment of the present disclosure.

FIG. 12 is a diagram illustrating a signal transmission/reception method according to an embodiment of the disclosure. FIG. 12 relates to exemplary implementation of at least part of the afore-described proposals of the present disclosure, and the present disclosure is not limited to FIG. 12.

Referring to FIG. 12, a UE receives DCI scheduling a plurality of PDSCHs (C05).

The UE performs PDSCH reception for at least part of the plurality of PDSCHs based on the DCI (C10).

The UE determines a specific codebook-based HARQ-ACK, based on a result of the PDSCH reception (C15).

The UE my transmit the HARQ-ACK in slot #N related to a specific candidate PDSCH-to-HARQ feedback timing value (K1 value) indicated by the DCI among a plurality of candidate K1 values configured for the UE (C20).

In determining the HARQ-ACK (C15), based on that a first-type codebook-based HARQ-ACK is configured for the scheduling of the plurality of PDSCHs, the UE may perform first SLIV pruning based on a combination of SLIV values of PDSCHs which can be potentially scheduled in each slot of a bundling window determined based on the plurality of candidate K1 values, and perform second SLIV pruning based on a combination of SLIV values of PDSCHs which can be potentially scheduled in at least one slot not belonging to the bundling window.

First ACK/NACK sub-payload for each slot of the bundling window may be determined based on the first SLIV pruning.

Second ACK/NACK sub-payload for the at least one slot not belonging to the bundling window may be determined based on the second SLIV pruning.

The UE may generate a total payload of the first-type codebook-based HARQ-ACK by concatenating the first ACK/NACK sub-payload and the second ACK/NACK sub-payload, or arranging the first ACK/NACK sub-payload and the second ACK/NACK sub-payload based on a time order of corresponding slots.

The at least one slot not belonging to the bundling window, for which the second SLIV pruning is performed, may be located before the bundling window in a time domain.

The at least one slot not belonging to the bundling window, for which the second SLIV pruning is performed, may be a slot in which a PDSCH located outside the bundling window among the plurality of PDSCHs is received.

A TDRA field included in the DCI may indicate one row of a TDRA table configured for the UE.

At least one row of the TDRA table may include a plurality of {K0, PDSCH mapping type, SLIV} parameter sets, where 'K0' may indicate a physical downlink control channel (PDCCH)-to-PDSCH slot offset.

The at least one slot not belonging to the bundling window, for which the second SLIV pruning is performed, may be determined based on 'K0' included in a parameter set that does not correspond to a last slot in each row of the TDRA table.

The bundling window for which the first SLIV pruning is performed is determined by combining the plurality of candidate K1 values with a parameter set corresponding to the last slot in each row of the TDRA table.

For example, on the assumption that P {K0, PDSCH mapping type, SLIV} parameter sets are included in a specific row of the TDRA table and correspond to a total of S slots (e.g., P PDSCHs scheduled based on the specific row are mapped to a total of S slots), S=P or S<P (i.e., S≤P) depending on the configuration of each row.

The HARQ-ACK is generated for a valid PDSCH except for an invalid PDSCH overlapping with a UL symbol configured by higher-layer signaling, among the plurality of PDSCHs.

The UE may perform each of the first SLIV pruning and the second SLIV pruning while excluding an invalid PDSCH overlapping with a UL symbol configured by higher-layer signaling.

In the process of determining the HARQ-ACK (C15), HARQ process IDs may be consecutively/sequentially assigned to valid PDSCHs.

Figure 13:
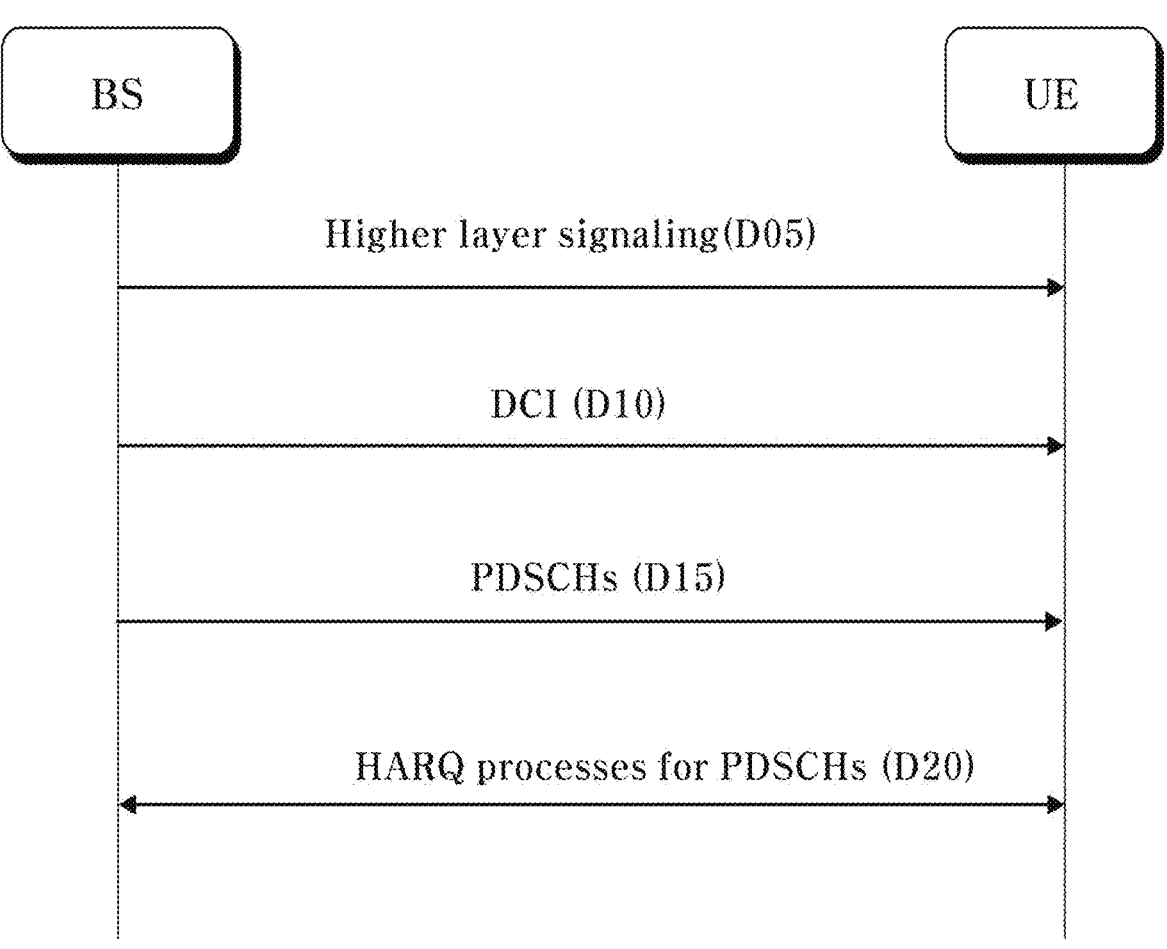

FIG. 13 is a diagram illustrating HARQ process ID allocation according to an embodiment of the present disclosure. FIG. 13 relates to exemplary implementation of the afore-described proposals of the present disclosure, and the present disclosure is not limited to FIG. 13.

Referring to FIG. 13, the UE may receive information indicating a UL/DL resource configuration by higher-layer signaling (D05); receive DCI that schedules a plurality of PDSCHs (D10); perform PDSCH reception for at least part of the plurality of PDSCHs based on the DCI (D15); and perform an HARQ process for each PDSCH based on a result of the PDSCH reception (D20). The HARQ process may include A/N determination and HARQ-ACK payload generation, HARQ-ACK reporting, and retransmission reception on the side of the UE, and may include HARQ-ACK reception and retransmission on the side of a BS.

The UE may determine a PDSCH overlapping with a UL symbol configured by the information indicating the UL/DL resource configuration among the plurality of PDSCHs to be an invalid PDSCH.

When performing the HARQ process for each PDSCH, the UE may consecutively or sequentially HARQ process IDs only to valid PDSCHs except for invalid PDSCHs.

Based on an HARQ process ID indicated by the DCI being #n, and the number of valid PDSCHs among the plurality of PDSCHs being k, the UE may allocate HARQ process ID #n, HARQ process ID #n+1, HARQ process ID #n+2, . . . , HARQ process ID #n+k−1 to k valid PDSCHs, respectively.

Figure 14:
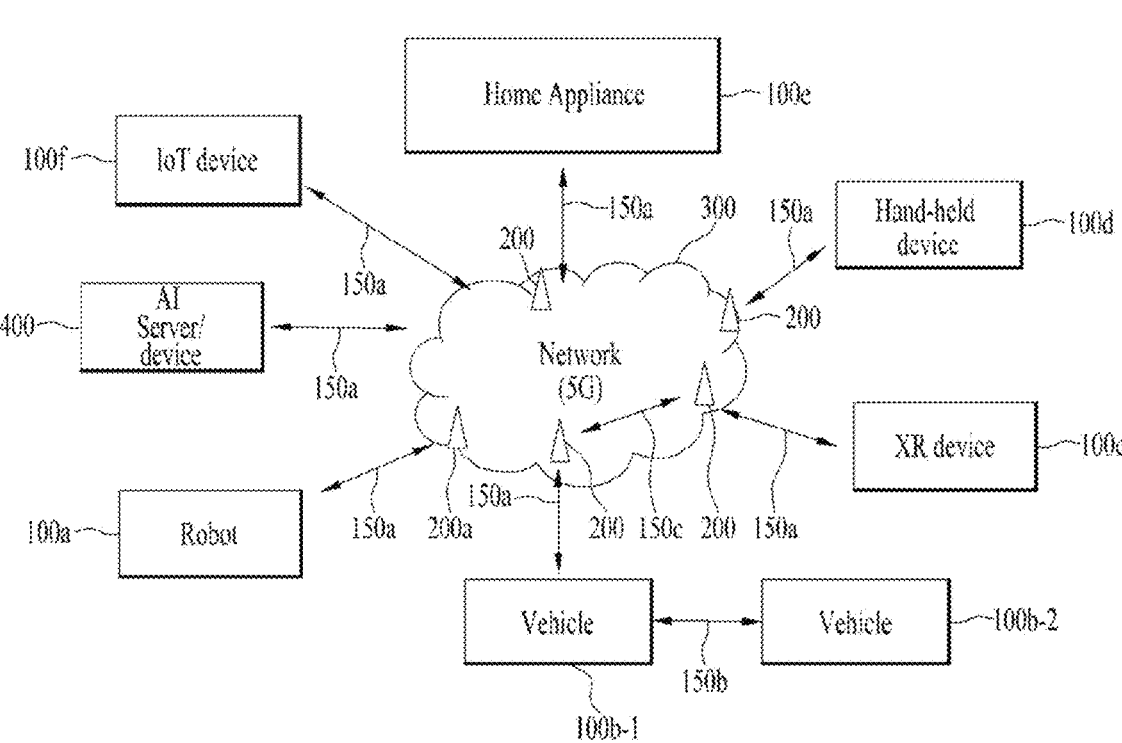

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
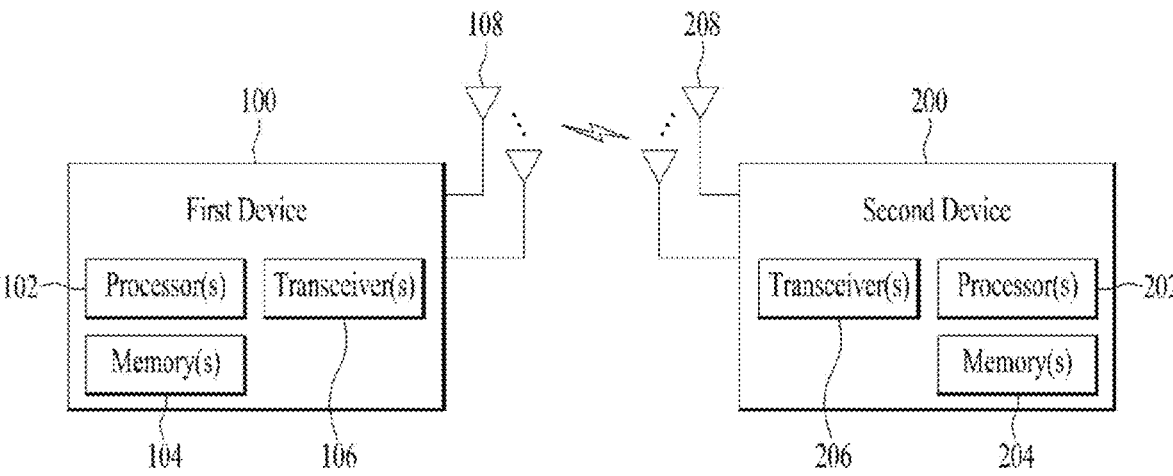

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 16 illustrates another example of a wireless device applied to the present disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 17 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
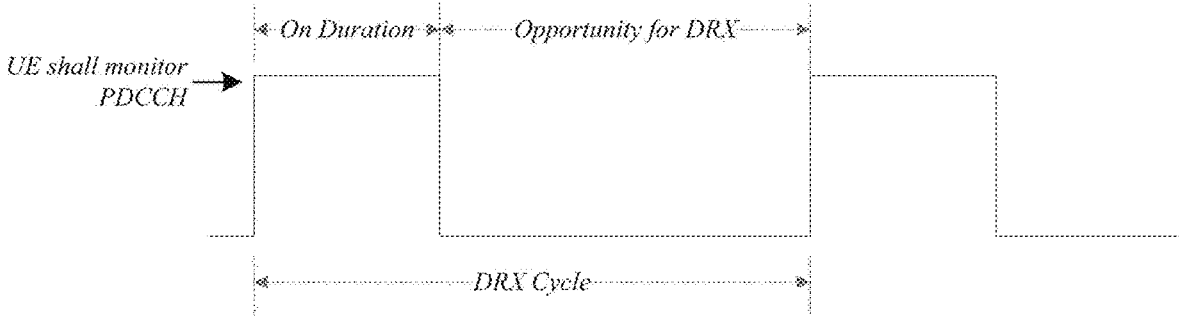
FIG. 18 illustrates an exemplary discontinuous reception (DRX) operation applicable to the present disclosure.

FIG. 18 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 6 describes a DRX operation of a UE (in the RRC_CONNECTED state). Referring to Table 6, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 6

|  | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a
  time period during which the UE is awake after a
  PDCCH occasion in which a PDCCH indicating initial
  UL or DL data has been detected
Value of drx-HARQ-RTT-TimerDL: defines the duration
  of a maximum time period until a DL retransmission is
  received after reception of a DL initial transmission.
Value of drx-HARQ-RTT-TimerDL: defines the duration
  of a maximum time period until a grant for a UL
  retransmission is received after reception of a grant for
  a UL initial transmission.
drx-LongCycleStartOffset: defines the duration and start-
  ing time of a DRX cycle.
drx-ShortCycle (optional): defines the duration of a short
  DRX cycle.

When any of drx-OnDurationTimer, drx-InactivityTimer,
drx-HARQ-RTT-TimerDL, and drx-HARQ-RTT-TimerDL
is running, the UE performs PDCCH monitoring in each
PDCCH occasion, staying in the awake state.

The above-described embodiments correspond to combi-
nations of elements and features of the present disclosure in
prescribed forms. And, the respective elements or features
may be considered as selective unless they are explicitly
mentioned. Each of the elements or features can be imple-
mented in a form failing to be combined with other elements
or features. Moreover, it is able to implement an embodi-
ment of the present disclosure by combining elements and/or
features together in part. A sequence of operations explained
for each embodiment of the present disclosure can be
modified. Some configurations or features of one embodi-
ment can be included in another embodiment or can be
substituted for corresponding configurations or features of
another embodiment. And, it is apparently understandable
that an embodiment is configured by combining claims
failing to have relation of explicit citation in the appended
claims together or can be included as new claims by amend-
ment after filing an application.

Those skilled in the art will appreciate that the present
disclosure may be carried out in other specific ways than
those set forth herein without departing from the spirit and
essential characteristics of the present disclosure. The above
embodiments are therefore to be construed in all aspects as
illustrative and not restrictive. The scope of the disclosure
should be determined by the appended claims and their legal
equivalents, not by the above description, and all changes
coming within the meaning and equivalency range of the
appended claims are intended to be embraced therein.

The present disclosure is applicable to UEs, BSs, or other
apparatuses in a wireless mobile communication system.

What is claimed is:

1. A method performed by a user equipment (UE), the
method comprising:
  receiving downlink control information (DCI) related to
    multiple-physical downlink shared channel (PDSCH)
    scheduling;
  receiving a plurality of PDSCHs based on the DCI; and
  transmitting hybrid automatic repeat request (HARQ)-
    acknowledgement (ACK) information for the plurality
    of PDSCHs, based on HARQ processes each associated
    with a HARQ process identifier (ID),
  wherein, based on that at least one PDSCH related to the
    DCI overlaps with an uplink (UL) symbol: consecutive
    HARQ process IDs are assigned for the plurality of
    PDSCHs in an order, except for the at least one PDSCH
    that overlaps with the UL symbol.

2. The method of claim 1, wherein each of the plurality of
PDSCHs is assigned with each of the consecutive HARQ
process IDs, respectively, and
  wherein the at least one PDSCH that overlaps with the UL
    symbol is not assigned with any HARQ process ID.

3. The method of claim 1, wherein the at least one PDSCH
that overlaps with the UL symbol is not received in the UE,
and a HARQ process ID is not assigned for the at least one
PDSCH not received.

4. The method of claim 1, wherein the consecutive HARQ
process IDs start from a value provided in the DCI.

5. The method of claim 1, wherein the UL symbol is
configured through higher layer signaling.

6. The method of claim 1, further comprising:
  receiving information regarding a plurality of time
    domain resource allocation (TDRA) rows each having
    one or more parameter sets,
  wherein each of the one or more parameter sets includes
    a K0 value and a start and length indicator value (SLIV)
    for a PDSCH, and the K0 value denotes DCI-to-
    PDSCH slot offset, and
  wherein the DCI includes TDRA information related to
    one of the plurality of TDRA rows.

7. The method of claim 6, wherein a number of PDSCHs
scheduled by the DCI is determined based on a number of
parameter sets included in a row related to the TDRA
information.

8. A non-transitory computer readable medium storing
program codes for performing the method of claim 1.

9. A device comprising:
  at least one memory configured to store instructions; and
  at least one processor configured to perform operations
    based on the instructions, the operations comprising:
  receiving downlink control information (DCI) related to
    multiple-physical downlink shared channel (PDSCH)
    scheduling;
  receiving a plurality of PDSCHs based on the DCI; and
  transmitting hybrid automatic repeat request (HARQ)-
    acknowledgement (ACK) information for the plurality
    of PDSCHs, based on HARQ processes each associated
    with a HARQ process identifier (ID),
  wherein, based on that at least one PDSCH related to the
    DCI overlaps with an uplink (UL) symbol: consecutive
    HARQ process IDs are assigned for the plurality of
    PDSCHs in an order, except for the at least one PDSCH
    that overlaps with the UL symbol.

10. The device of claim 9, further comprising:
  a transceiver,
  wherein the device is a user equipment (UE).

11. The device of claim 9, wherein the device is a
processing device configured to control a user equipment
(UE) in a wireless communication system.

12. A method performed by a base station (BS), the
method comprising:
  transmitting, to a user equipment (UE), downlink control
    information (DCI) related to multiple-physical down-
    link shared channel (PDSCH) scheduling;
  transmitting, to the UE, a plurality of PDSCHs based on
    the DCI; and
  receiving hybrid automatic repeat request (HARQ)-ac-
    knowledgement (ACK) information for the plurality of
    PDSCHs, through the UE's HARQ processes each
    associated with a HARQ process identifier (ID),
  wherein, based on that at least one PDSCH related to the
    DCI overlaps with an uplink (UL) symbol: consecutive
    HARQ process IDs are assigned for the plurality of PDSCHs in an order, except for the at least one PDSCH that overlaps with the UL symbol.

13. The method of claim 12, wherein each of the plurality of PDSCHs is assigned with each of the consecutive HARQ process IDs, respectively, and wherein the at least one PDSCH that overlaps with the UL symbol is not assigned with any HARQ process ID.

14. The method of claim 12, wherein the at least one PDSCH that overlaps with the UL symbol is not transmitted, and a HARQ process ID is not assigned for the at least one PDSCH not transmitted.

15. The method of claim 12, wherein the consecutive HARQ process IDs start from a value provided in the DCI.

16. The method of claim 12, wherein the UL symbol is configured through higher layer signaling.

17. The method of claim 12, further comprising:

transmitting information regarding a plurality of time domain resource allocation (TDRA) rows each having one or more parameter sets, wherein each of the one or more parameter sets includes a K0 value and a start and length indicator value (SLIV) for a PDSCH, and the K0 value denotes DCI-to-PDSCH slot offset, and wherein the DCI includes TDRA information related to one of the plurality of TDRA rows.

18. The method of claim 17, wherein a number of PDSCHs scheduled by the DCI is determined based on a number of parameter sets included in a row related to the TDRA information.

19. A non-transitory computer readable medium storing program codes for performing the method of claim 12.

20. A device comprising:

at least one memory configured to store instructions; and at least one processor configured to perform operations based on the instructions, the operations comprising:

transmitting, to a user equipment (UE), downlink control information (DCI) related to multiple-physical downlink shared channel (PDSCH) scheduling;

transmitting, to the UE, a plurality of PDSCHs based on the DCI; and receiving hybrid automatic repeat request (HARQ)-acknowledgement (ACK) information for the plurality of PDSCHs, through the UE's HARQ processes each associated with a HARQ process identifier (ID), wherein, based on that at least one PDSCH related to the DCI overlaps with an uplink (UL) symbol: consecutive HARQ process IDs are assigned for the plurality of PDSCHs in an order, except for the at least one PDSCH that overlaps with the UL symbol.

* * * * *